(12) United States Patent
Dean, Jr. et al.

(10) Patent No.: US 7,393,142 B2
(45) Date of Patent: Jul. 1, 2008

(54) MOLDED FERRULE WITH REFERENCE SURFACE FOR END FACE GEOMETRY MEASUREMENT

(75) Inventors: David L. Dean, Jr., Hickory, NC (US); James P. Luther, Hickory, NC (US); Robert B. Elkins, II, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/642,214

(22) Filed: Dec. 20, 2006

(65) Prior Publication Data

US 2007/0098328 A1 May 3, 2007

Related U.S. Application Data

(63) Continuation-in-part of application No. 10/652,119, filed on Aug. 29, 2003, now abandoned.

(51) Int. Cl.
*G02B 6/38* (2006.01)
(52) U.S. Cl. ........................................................ 385/58
(58) Field of Classification Search .................... 385/58, 385/59, 60, 65, 78, 82, 83
See application file for complete search history.

(56) References Cited

U.S. PATENT DOCUMENTS

| | | | | |
|---|---|---|---|---|
| 4,834,676 A | * | 5/1989 | Tackett | 439/584 |
| 5,212,752 A | * | 5/1993 | Stephenson et al. | 385/78 |
| 5,414,786 A | | 5/1995 | Ota et al. | 385/63 |
| 5,432,880 A | | 7/1995 | Diner | 385/85 |
| 5,519,799 A | | 5/1996 | Murakami et al. | 385/78 |
| 5,867,621 A | | 2/1999 | Luther et al. | 385/59 |
| 5,926,596 A | | 7/1999 | Edwards et al. | 385/78 |
| 6,340,247 B1 | | 1/2002 | Sakurai et al. | 385/78 |
| 6,481,900 B1 | | 11/2002 | Maeno et al. | 385/78 |
| 6,497,516 B1 | * | 12/2002 | Toyooka et al. | 385/78 |
| 6,663,377 B1 | | 12/2003 | Dean, Jr. et al. | 425/190 |
| 7,004,639 B2 | * | 2/2006 | Norland | 385/53 |
| 2003/0026071 A1 | | 2/2003 | Liu et al. | 361/760 |
| 2003/0068137 A1 | | 4/2003 | Rolston et al. | 385/78 |
| 2004/0065548 A1 | | 4/2004 | Kaku et al. | 205/75 |
| 2005/0036742 A1 | * | 2/2005 | Dean et al. | 385/71 |

OTHER PUBLICATIONS

"High Performance Connectors with Cylindrical Ceramic Ferrule and Non-Polished Fiber End Face", by Pitassi et al., Nation Fiber Optic Engineers Conference, Jun. 18-22, 1995, Boston, MA, pp. 659-670.

* cited by examiner

*Primary Examiner*—Chandrika Prasad

(57) ABSTRACT

A ferrule comprising a molded ferrule body defining fiber bores, an end face of a connective end of the ferrule positioned about the fiber bores, and an integral reference surface for determining the angularity of the end face. The integral reference surface is not machined subsequent to a ferrule molding process and is accessible after assembly of the ferrule body into a connector body. A multi-fiber ferrule comprising a connective end defining an end face, a rear nonconnective portion defining a protruding shoulder, and an integral reference datum positioned on a surface of the shoulder accessible for determining the angularity of a plane defined by the end face, wherein the integral datum is accessible when the ferrule is received within a connector body.

17 Claims, 21 Drawing Sheets

MOLDED FERRULE WITH REFERENCE SURFACE FOR END FACE GEOMETRY MEASUREMENT

CROSS-REFERENCE TO RELATED APPLICATIONS

This application is a Continuation-In-Part of pending U.S. patent application Ser. No. 10/652,119 filed Aug. 29, 2003 now abandoned and entitled "Molded Fiber Optic Ferrule with Integrally Formed Geometry Features", the contents of which are hereby incorporated by reference.

BACKGROUND OF THE INVENTION

1. Field of the Invention

The present invention relates generally to the field of multifiber connectors and, more specifically, to molded fiber optic ferrules with an integral reference surface for end face geometry measurement.

2. Description of the Related Art

Optical fibers are used for a variety of applications including voice communications, data transmission and the like. In order to interconnect a plurality of optical fibers with a minimum amount of attenuation, a pair of multifiber connectors is preferably mated such that the opposing optical fibers are biased into contact with one another. To achieve optimal transmission without utilizing refractive index matching gel, the multifiber connectors must be precisely aligned in order to correspondingly align the individual optical fibers in the connectors. This alignment is typically provided by guide pins that extend outwardly from the end face of a male multifiber ferrule for insertion into corresponding guide pin openings, grooves or other structures defined by a female multifiber ferrule. In addition to precise alignment, the geometry of the ferrule and, in particular, the polish geometry of the end face of the ferrule, is extremely important to insure proper fiber-to-fiber contact. In this regard, at least the portion of the end face of each ferrule that is proximate to the optical fibers is preferably polished to define a plane extending perpendicular to the longitudinal axis defined by the guide pin openings and, therefore, perpendicular to the fiber bores. In addition, the planar surface defined by the portion of the end face of each ferrule proximate to the fiber bores is precisely positioned relative to the ends of the optical fibers. For example, with proper polish geometry, the optical fibers will extend by a predetermined distance beyond the end face of the ferrule so that fiber-to-fiber contact between opposing optical fibers is established. If, however, the polish geometry is not precisely defined, fiber-to-fiber contact may be prevented or otherwise obstructed by contact between those portions of the end faces of the opposing ferrules that extend beyond the ends of the optical fibers.

In order to monitor the polish geometry and the resulting quality of each ferrule, it is desirable to determine the planarity of the end face of the ferrule and the angle of the end face relative to the guide pin openings. As such, referring to prior art FIGS. 1a-b, a conventional ferrule 30 is shown in which an end face reference surface 32, also referred to herein as the "region of interest," is measured for planarity. The end face reference surface 32 is an area on the end face 34 of the ferrule 30 in the vicinity of the plurality of fiber bores 42. Truncated measurement pins 33 having very precisely machined ends that extend from the end face 34 of the ferrule 30 are used to determine if the end face reference surface 32 of the ferrule 30 has been properly molded or machined to be planar. In order to determine the planarity of end face reference surface 32, the measurement pins 33 are inserted into guide pin openings 36 to define a measurement pin reference surface 38. Referring to FIG. 1b, the measurement pins 33 are machined to be very flat on one of their ends. The plane defined by the measurement pin reference surface 38 of one or both of the measurement pins 33 is then compared to the end face reference surface 32 using an interference vision system, such as an interferometer having 3D capabilities. After comparative measurements have been made and the planarity of the end face reference surface 32 confirmed, the measurement pins 33 are removed from the guide pin openings 36 and replaced with conventional guide pins to produce a male ferrule. A female ferrule is produced with vacant guide pin openings 36 operable for receiving the guide pins of a respective male ferrule. Predetermined lengths of optical cable may then be produced by combining sections of cable comprising mating male and female ferrules. An example of a multi-fiber ferrule measured using truncated pins can be found in U.S. Pat. No. 5,867,621 issued to Luther et al.

There are several disadvantages associated with using truncated precision measurement pins 33 to measure the planarity of the end face reference feature 32 and/or the angularity of the end face 34. For one, the measurement pins 33 are very expensive to manufacture because of the very precise machining of one of their ends. Furthermore, the measurement pins 33 may be easily lost due to their extremely small size. Also, when using the ends of the measurement pins 33 as a reference surface, it is necessary to make the optical measurements using a relatively expensive interference vision system having 3D capabilities. Still further, with conventional multifiber ferrules, male multifiber ferrules cannot be measured for planarity after assembly due to the difficulty in removing the guide pins without damaging the ferrule assembly.

In particular instances, it is desired to produce a ferrule having an end face with an angle other than normal (i.e., perpendicular) to the longitudinal axis of the ferrule body. In such cases, the angle is typically introduced by machining the end face of the ferrule subsequent to the molding process. By machining the angle as opposed to molding it, the end face of every ferrule must be individually machined after the ferrule is removed from the mold. This subsequent machining step leads to a decrease in ferrule uniformity and an increase in ferrule production time. Therefore, it would be desirable to rapidly and economically produce a large number of substantially identical ferrules having an end face with a predetermined angle relative to the longitudinal axis of the ferrule body, without having to machine each ferrule subsequent to the molding process.

Thus, there is a need in the art for a fiber optic ferrule that eliminates the need for using truncated precision measurement pins and an interference vision system having 3D capabilities to determine the planarity of the region of interest on the end face of the ferrule. Such ferrule should have integral geometry features that permit planarity measurements of at least the region of interest of the end face, and angularity measurements of the entire end face, to be determined more readily and more economically. Such ferrule should substantially reduce ferrule manufacturing, assembly and quality inspection times. Such ferrule should allow for region of interest planarity and end face angularity measurements to be made for both male and female ferrules after ferrule assembly and throughout the life of the ferrule. Such ferrule should eliminate the step of having to machine a predetermined angle on the end face of the ferrule subsequent to the molding process.

BRIEF SUMMARY OF THE INVENTION

To achieve the foregoing and other objects, the present invention, as embodied and broadly described herein, provides various embodiments of multifiber ferrules comprising a molded ferrule body having an end face and defining a plurality of bores extending through the ferrule body for receiving end portions of respective optical fibers, the ferrule body further defining at least one opening through the end face adapted to receive an alignment member for aligning the end portions of the respective optical fibers with corresponding end portions of optical fibers of a mating multifiber ferrule, and at least one integrally formed geometric reference feature molded on an exterior surface of the ferrule for determining end face planarity and angularity, wherein the end face is not machined subsequent to the molding process. The molded ferrule body having the at least one molded-in geometry feature eliminates the need for using at least one truncated precision measurement pin and an interference vision system having 3D capabilities to determine the planarity of the region of interest on the end face and/or the angularity of the end face relative to a reference plane defined by the truncated end of the measurement pin.

In various embodiments, a multifiber ferrule is described comprising a molded ferrule body having an end face and defining a plurality of bores extending through the ferrule body for receiving end portions of respective optical fibers, the ferrule body further defining at least one opening through the end face adapted to receive an alignment member for aligning the end portions of the respective optical fibers with corresponding end portions of optical fibers of a mating multifiber ferrule, the opening defining a longitudinal axis extending at least partially through the ferrule body, and wherein the end face comprises a first surface defining a first plane that is generally normal to the longitudinal axis, and a second surface defining a second plane disposed at a predetermined angle relative to the first plane and the longitudinal axis. The first and second surfaces are formed by a precision molding process, thereby eliminating the need for machining the predetermined angle of the end face subsequent to the molding process. In various embodiments, a ferrule having an end face with a predetermined angle relative to the longitudinal axis of the ferrule body may further comprise a geometric reference feature disposed adjacent to the end face.

In another embodiment, a method is provided whereby a multifiber ferrule is molded comprising a ferrule body having an end face and defining a plurality of bores extending through the ferrule body for receiving end portions of respective optical fibers, the ferrule body also defining at least one opening through the end face adapted to receive a guide pin for aligning the end portions of the respective optical fibers with corresponding end portions of optical fibers of a mating multifiber ferrule, the opening defining a longitudinal axis extending at least partially through the ferrule body, the ferrule body further comprising a geometric reference feature adjacent to the end face operable for determining end face planarity and angularity subsequent to the molding process and throughout the useful life of the ferrule.

In a further embodiment, a method is provided whereby a multifiber ferrule is molded comprising a ferrule body having an end face and defining a plurality of bores extending through the ferrule body for receiving end portions of respective optical fibers, the ferrule body also defining at least one opening through the end face adapted to receive a guide pin for aligning the end portions of the respective optical fibers with corresponding end portions of optical fibers of a mating multifiber ferrule, the opening defining a longitudinal axis extending at least partially through the ferrule body, the end face comprising a first surface defining a first plane that is generally normal to the longitudinal axis, and a second surface disposed at a predetermined angle relative to the first surface and the longitudinal axis defined by the opening of the ferrule body.

BRIEF DESCRIPTION OF THE DRAWINGS

The above described and other features, aspects, and advantages of the present invention are better understood when the following detailed description of the invention is read with reference to the accompanying drawings, wherein.

DETAILED DESCRIPTION OF THE INVENTION

Figure 1A:
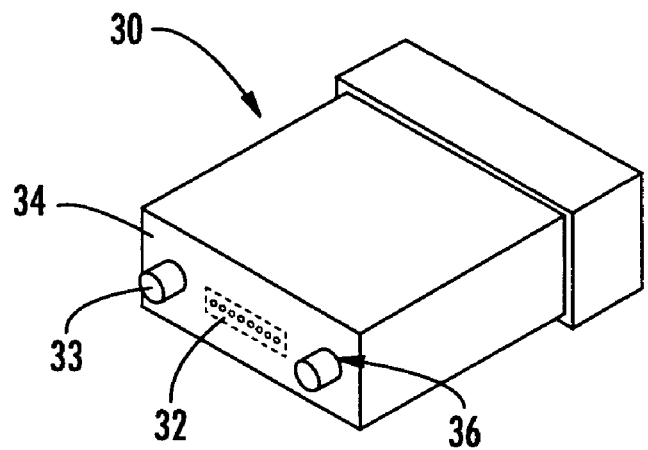
FIGS. 1a-b are perspective and enlarged end face views, respectively, of a prior art fiber optic ferrule in which truncated precision measurement pins are used for determining the planarity of a region of interest on the end face of the ferrule and/or the angularity of the end face relative to a reference plane.
Figure 1B:
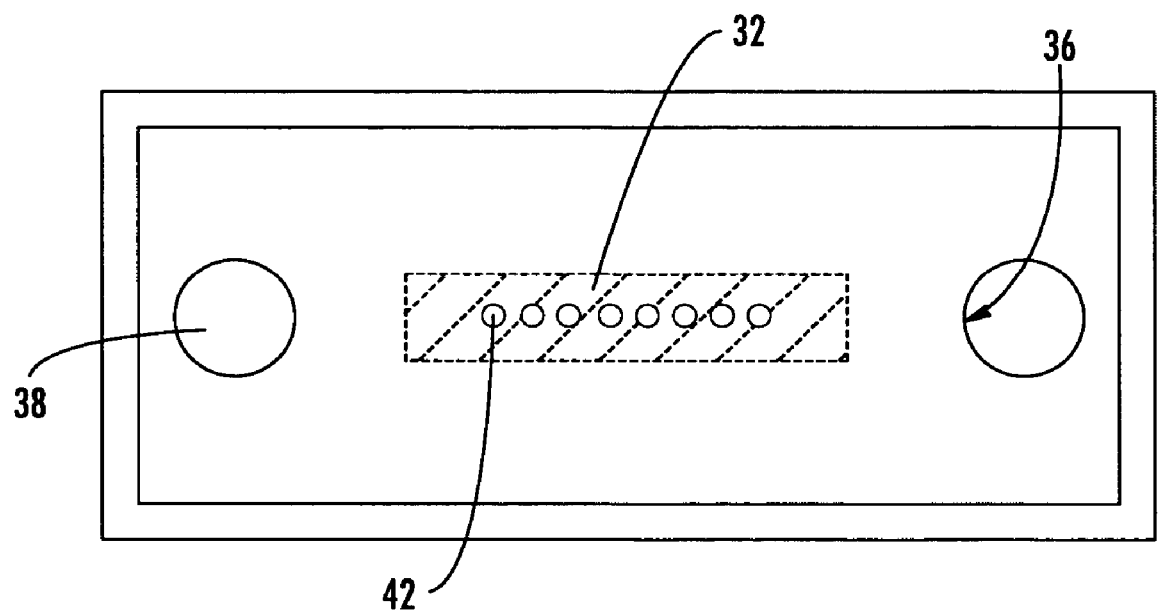

The present invention will now be described more fully hereinafter with reference to the accompanying drawings in which preferred embodiments of the invention are shown. This invention may, however, be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The present invention describes molded fiber optic ferrules and methods for making the same. In various embodiments, the molding process produces a fiber optic ferrule having an integrally formed geometry feature that functions as a reference surface for allowing accurate end face geometry measurement. In specific embodiments, the molding process produces a ferrule having at least one geometric reference feature disposed on an exterior surface of the ferrule body adjacent to an end face reference surface. The geometric reference feature eliminates the need for using truncated precision measurement pins and an interference vision system having 3D capabilities to measure the planarity of a region of interest on the end face of the ferrule and/or the angularity of the end face relative to a plane defined by the truncated end of the measurement pin. The term "region of interest" is used herein to describe at least a portion of the end face in the vicinity of the plurality of fiber bores. The geometric reference feature may be used to precisely determine the planarity of the region of interest. The integrally formed geometry feature may comprise a geometric reference feature, a reference datum, a measurement datum, a polishing angle or an end face comprising a first surface defining a first plane and a second surface defining a second plane, wherein the second surface is disposed at a predetermined angle relative to the first surface and the longitudinal axis of the ferrule body. Throughout the disclosure, the molded-in geometric reference feature may be used as a datum to measure fiber height and/or end face planarity. At least one end face angle may be determined based upon an angular difference between the reference plane defined by the geometric reference feature and a corresponding plane defined by the end face of the ferrule.

In one embodiment, the present invention provides a method for determining an end face angle of a fiber optic ferrule having a geometric reference feature defined by the ferrule body. The method comprises molding a fiber optic ferrule with an integrally formed geometric reference feature, measuring a reference plane defined by the feature, measuring a plane defined by at least a portion of the end face of the ferrule (i.e., the region of interest), and determining at least one end face angle based upon an angular difference between the reference plane of the feature and the plane defined by the end face of the ferrule.

In various embodiments described below, a multifiber ferrule is provided comprising a molded ferrule body having an end face that is not machined subsequent to the molding process. As used herein throughout the specification, machining includes any manufacturing or assembly process intended to remove more than an insubstantial amount of material from the end face, or to shape the end face to a predetermined configuration, such as grinding, etching, etc. As used herein, machining is not intended to include fiber polishing and cleaning. The end face defines a plurality of fiber bores extending through the ferrule body for receiving end portions of respective optical fibers. The ferrule body defines at least one guide pin opening through the end face adapted to receive an alignment member for aligning the end portions of the respective optical fibers with corresponding end portions of the opposing optical fibers of a mating multifiber ferrule. The guide pin opening defines a longitudinal axis extending at least partially through the ferrule body and parallel to the fiber bores and the longitudinal axis of the ferrule body.

In one example, the reference feature may be a geometric reference feature, such as a reference datum, used to measure end face planarity and angularity subsequent to molding and throughout the useful life of the ferrule. The reference surface remains visually accessible after connector assembly. In contrast to the prior art, the geometric reference feature of the present invention may be used as a reference to determine the angularity of the end face of an assembled male ferrule. Thus, the geometric reference feature may be utilized as a permanent point of reference.

As known to those skilled in the art, the ferrule may be assembled according to any conventional technique for assembling multifiber ferrules. In one assembly example, the ferrule may be molded defining a pair of guide pin openings and a predetermined number of fiber bores extending through the ferrule body for receiving a plurality of optical fibers. An adhesive may be inserted into the fiber bores, followed by the optical fibers. For a male ferrule, an adhesive and guide pins are also inserted into the guide pin openings. The ferrule assembly is then allowed to dry or cure in a conventional oven, autoclave, or the like, in a known manner.

Figure 2A:
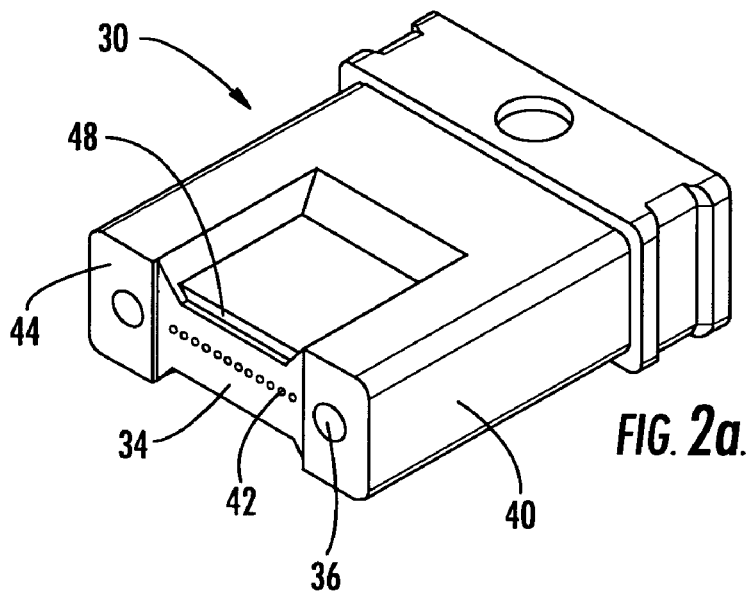
FIGS. 2a-c are perspective, top plan and enlarged top plan views, respectively, of a molded ferrule having bumpers, an end face and a recessed reference feature.
Figure 2B:
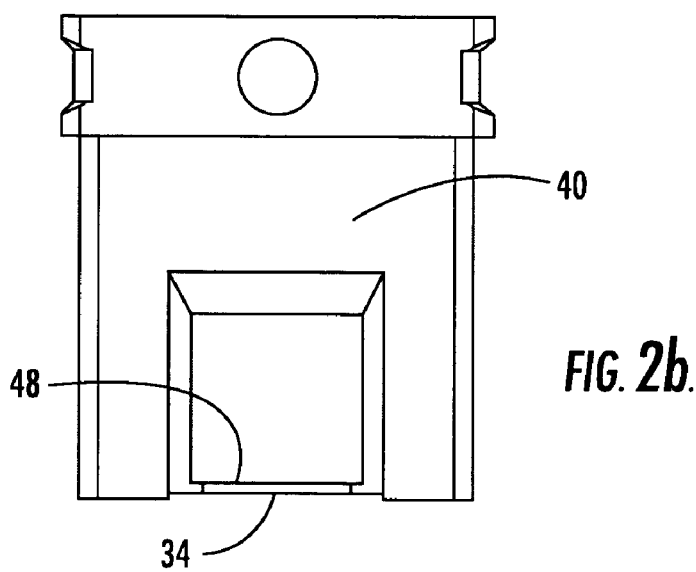
Figure 2C:
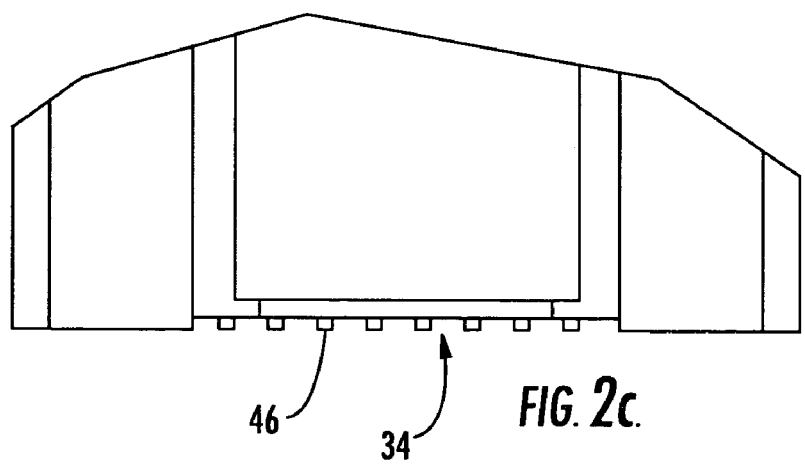
Figure 2D:
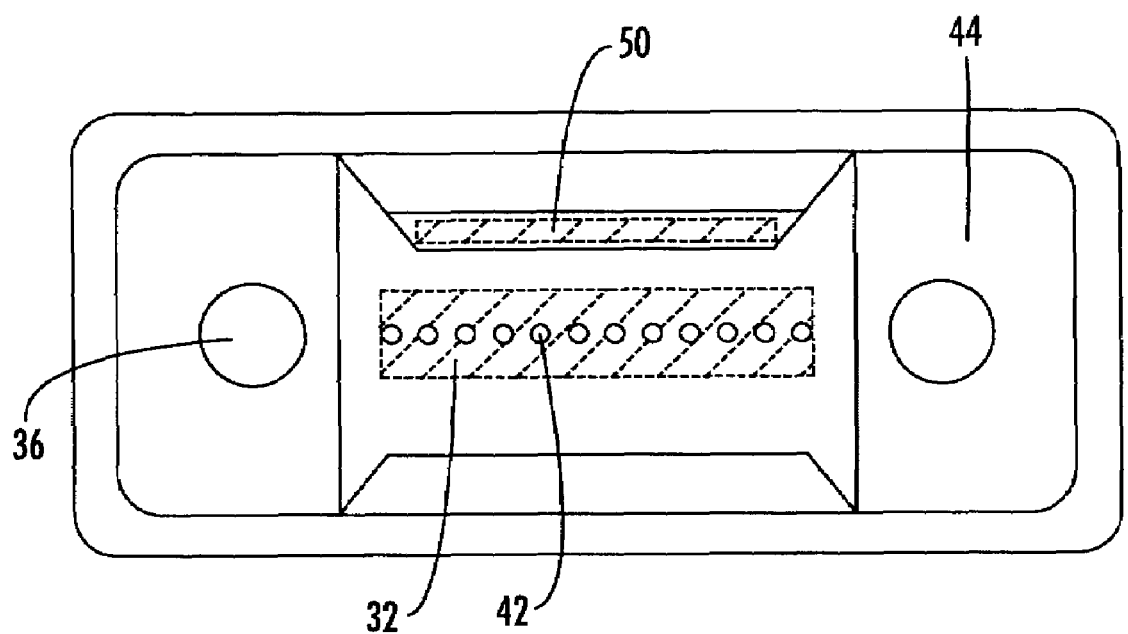
FIG. 2d is an enlarged end face view of the ferrule of FIG. 2a identifying the reference plane and the end face plane.

Referring to FIGS. 2a-d, in one embodiment the molded fiber optic ferrule 30 mounted upon the end portions of the optical fibers generally includes a ferrule body 40 having a generally rectangular-shaped end face 34 about the connective end of the ferrule. Referring to FIG. 2d, while the end face 34 of the ferrule 30 of the present invention comprises a region of interest 32 on the end face 34 in the vicinity of the fiber bores 42, the remainder of the ferrule may have any desired shape and, as such, may have the shape of any conventional ferrule including, but not limited to, a multifiber ferrule, such as an MTP, MT-RJ, MPO or SC/DC ferrule, or a single fiber ferrule, such as an SC, ST, or LC ferrule.

The ferrule body 40 defines at least one fiber bore 42 extending along a longitudinal axis of the ferrule body 40 and adapted to receive an optical fiber 46 therein. While the ferrule may be a single fiber ferrule that defines only a single fiber bore 42, ferrules shown throughout and described herein are multifiber ferrules and define a plurality of fiber bores 42 adapted to receive a plurality of optical fibers 46 therein. In addition, while the multifiber ferrules are shown having only a single row of fiber bores 42, the molded ferrule may comprise any number of fiber bores 42 arranged in any predetermined manner including, but not limited to, multiple rows of fiber bores 42 (e.g., a multiple row, multifiber array). Typically, multifiber ferrules also define at least one and, more commonly, a pair of guide pin openings 36 adapted to receive respective alignment members, such as guide pins (not shown).

As shown in FIG. 2a, the plurality of fiber bores 42 generally open through a medial portion of the end face 34 of the ferrule body 40, while the guide pin openings 36 generally open through a lateral portion of the end face 34 of the ferrule body 40. At least one and preferably a pair of polishing bumpers 44 extend outwardly in a forward direction relative to the end face 34. Referring to FIG. 2c, the plurality of optical fibers may extend a predetermined amount beyond the surface of the end face 34. In all embodiments, the amount of protrusion of the optical fibers from the end face 34 may be in the range from about 0 to about 15 microns, more preferably from about 3 to about 15 microns. A molded-in reference feature 48 is located adjacent to, and recessed from, the end face 34. The feature 48 comprises a predetermined shape and defines a reference surface 50, as shown in FIG. 2d.

To ensure proper contact between optical fibers, and thus good optical transmission at the ferrule end face 34, the end face 34 should be polished generally perpendicular to the fiber bores 42. The guide pin openings 36 are generally parallel to the fiber bores 42, since the guide pin openings 36 and the guide pins are used to align mating ferrules, and particularly the opposing optical fibers of mating ferrules. In one embodiment, with respect to the reference plane, the guide pin bores are perpendicular to within 0.003 mm over the length of the guide pin bore. For example, given about a 2.0 mm guide bore length, there is about a 0.021 mdeg allowable angle between the reference plane and each guide pin bore. The bumpers 44 may provide a polishing plane for one step in obtaining coplanarity of the optical fibers 46. As such, the height of the bumpers 44 after polishing may be used as a reference to determine the height of the optical fibers 46. The bumpers 44 are eventually ground down to a predetermined depth, for example, the bumpers 44 may be entirely removed down to the end face 34. As stated above, the end face surface 32 is not machined subsequent to the molding process. In various embodiments, the reference surface 50 is not altered subsequent to the molding process, even when the bumpers 44 are entirely removed.

In various embodiments, the optical fibers 46 may be polished substantially normal (i.e., perpendicular) to the longitudinal axis of the ferrule body 40, resulting in a "best fit" plane of the fibers 46 that is substantially parallel to both the plane defined by the reference surface 50 and the plane defined by the end face reference surface 32. The reference surface 50 may be used to verify the geometry of the end face reference surface 32 both before and after polishing. In order to determine angularity between the surfaces 32 and 50, the surfaces may be measured and compared using a non-interference vision system. In alternative embodiments, an interference vision system may be used to determine angularity. The surfaces may be measured and compared to determine relative parallelness. As stated above, it is desirable that the reference surfaces 32, 50 are substantially parallel, and more preferably, exactly parallel. It is also desirable that the end face reference surface 32 be polished normal to the longitudinal axis of the ferrule body 40, particularly in the direction of its long axis (i.e., X-direction).

Figure 3A:
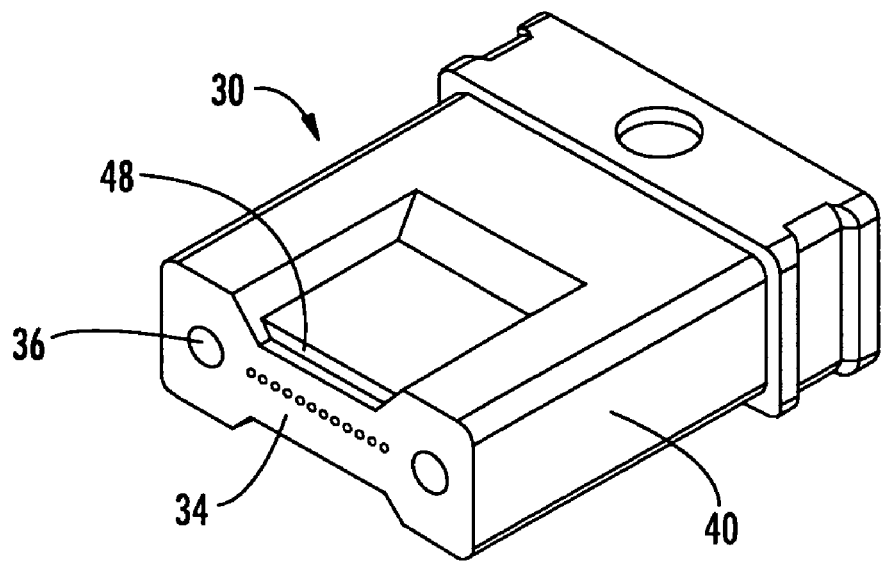
FIGS. 3a-b are perspective and enlarged end face views, respectively, of a ferrule without bumpers and having a reference surface recessed from the end face.
Figure 3B:
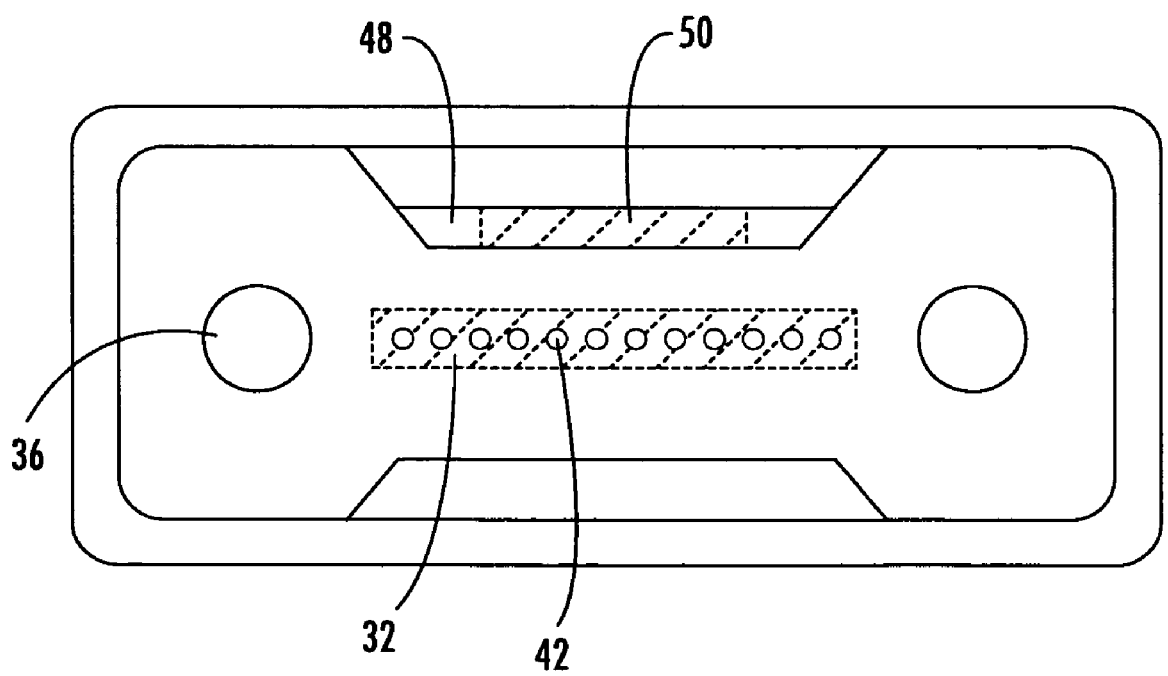

Referring to FIGS. 3a-b, in another embodiment the ferrule 30 includes a ferrule body 40 having an end face 34 and an end face reference surface 32. A plurality of fiber bores 42 open through a medial portion of the end face 34 of the ferrule body 40. In contrast to the embodiment show in FIGS. 2a-d, the ferrule 30 shown in FIGS. 3a-b does not comprise bumpers. In order for contact between opposing optical fibers (i.e., fiber-to-fiber) to be established, the optical fibers (not shown) may protrude a predetermined amount from the surface of the end face 34. In all embodiments of the present invention, it is also envisioned that the optical fibers may be polished generally flush with the surface of the end face 34. As previously described, the reference feature 48 is located adjacent the top surface of the ferrule body 40 proximate to, and recessed from, the end face 34. However, the reference feature 48 may be located adjacent the opposite side (i.e., bottom surface), or adjacent both the top and bottom surfaces of the ferrule body 40. Furthermore, the reference feature 48 may be located more distant from the end face 34, as long as the distance between the reference feature 48 and the end face 34 does not introduce significant errors into the measurement system utilized to determine the planarity of the end face reference surface 32. The reference feature 48 comprises a reference surface 50 that is precisely perpendicular to the longitudinal axis of the guide pin openings 36. Planarity comparison measurements may be used to determine the angle between the reference surfaces, and thus, the longitudinal axis of the ferrule body 40.

Figure 4A:
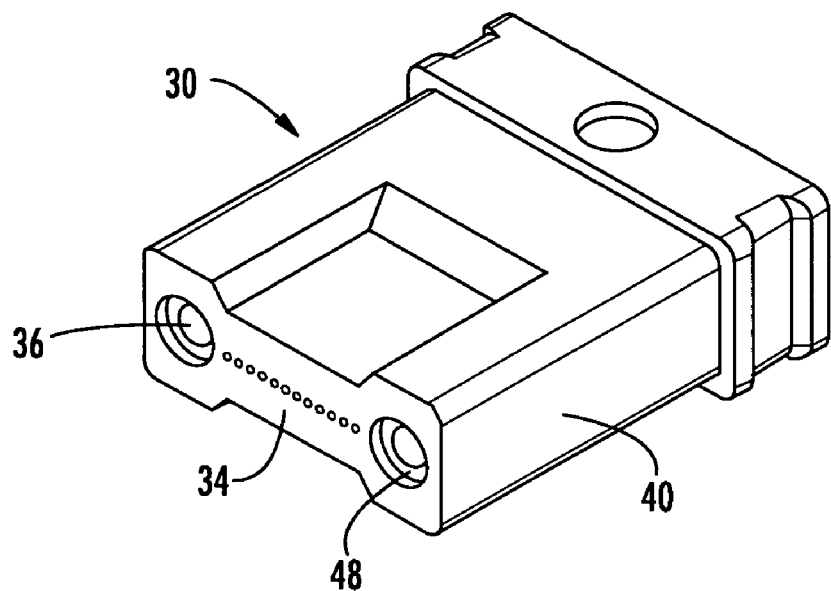
FIGS. 4a-b are perspective and enlarged end face views, respectively, of a ferrule having a reference surface within the guide pin openings.
Figure 4B:
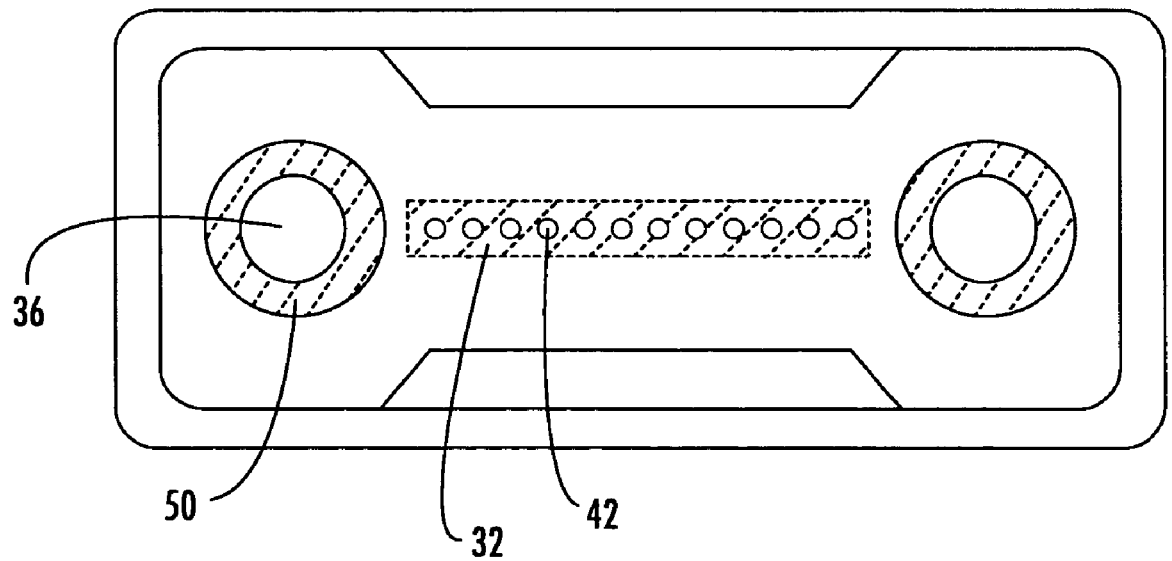

Referring to FIGS. 4a-b, in a further embodiment a molded ferrule 30 is shown in which the molded guide pin openings 36 define inwardly-stepped geometric reference features 48. In this embodiment, the features 48 have a generally circular shape and define the reference surfaces 50 identified in FIG. 4b. As with the embodiment shown in FIGS. 3a-b, the ferrule body 40 is molded such that the fiber bores 42 open through the forwardmost and medial portion of the end face 34. In all embodiments, if it is determined that the end face reference surface 32 is at an angle to a geometric feature reference surface 50, the ferrule 30 may be rejected or the end face 34 subsequently machined to substantially eliminate the angle between the end face reference surface 32 and the geometric feature reference surface 50. After any subsequent machining of the end face 34, the end face reference surface 32 and the geometric feature reference surface 50 may be compared again for parallelness. Additional machining and polishing processes may be performed and repeated until surfaces 32 and 50 are rendered substantially parallel.

Figure 5A:
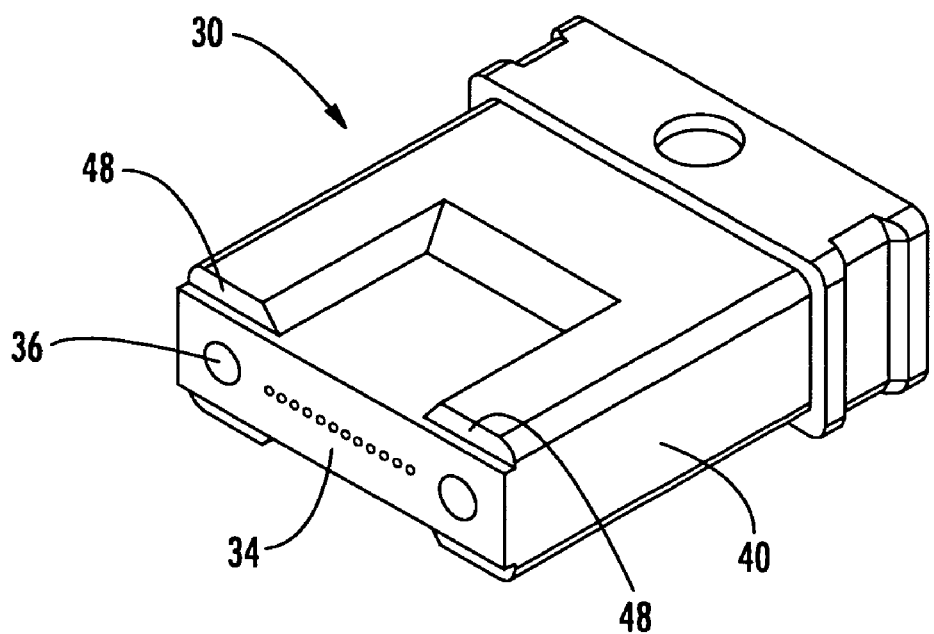
FIGS. 5a-b are perspective and enlarged end face views, respectively, of a ferrule having a pair of recessed, spaced apart reference features.
Figure 5B:
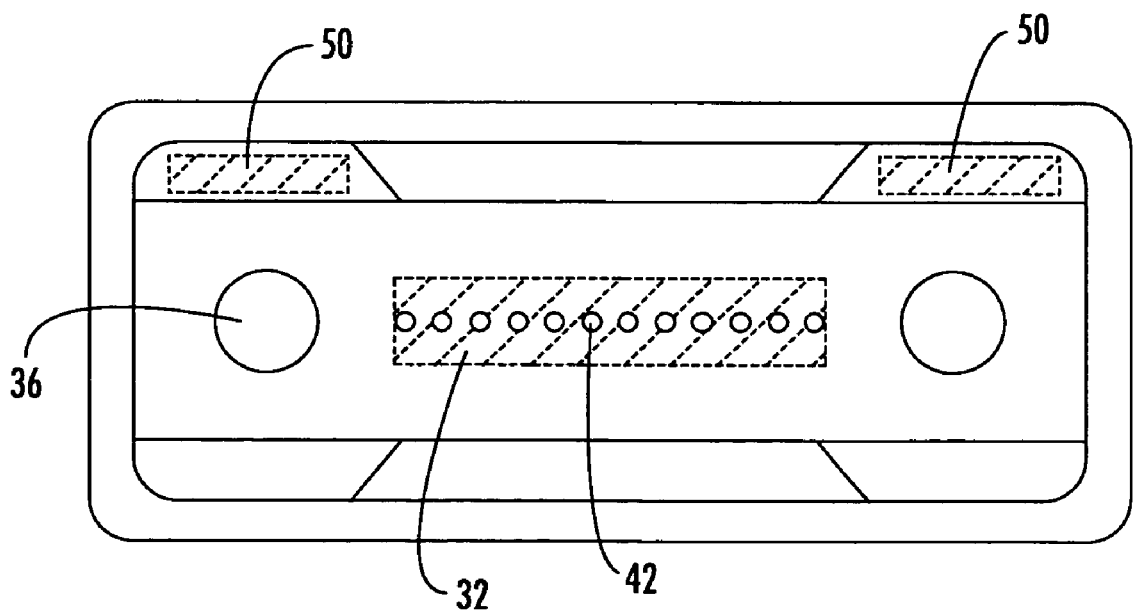

Referring to FIGS. 5a-b, in a still further embodiment a molded fiber optic ferrule 30 is shown in which a plurality of molded-in (i.e., integrally formed) geometric reference features 48 are recessed from the end face 34. The reference features 48 are generally trapezoid-shaped and disposed at the front corners of the ferrule body 40 adjacent the top surface. However, it is envisioned that that the geometric reference features 48 may be of any shape and may be disposed at any location from which a measurement of a geometric feature reference surface 50 may be readily obtained.

Figure 6A:
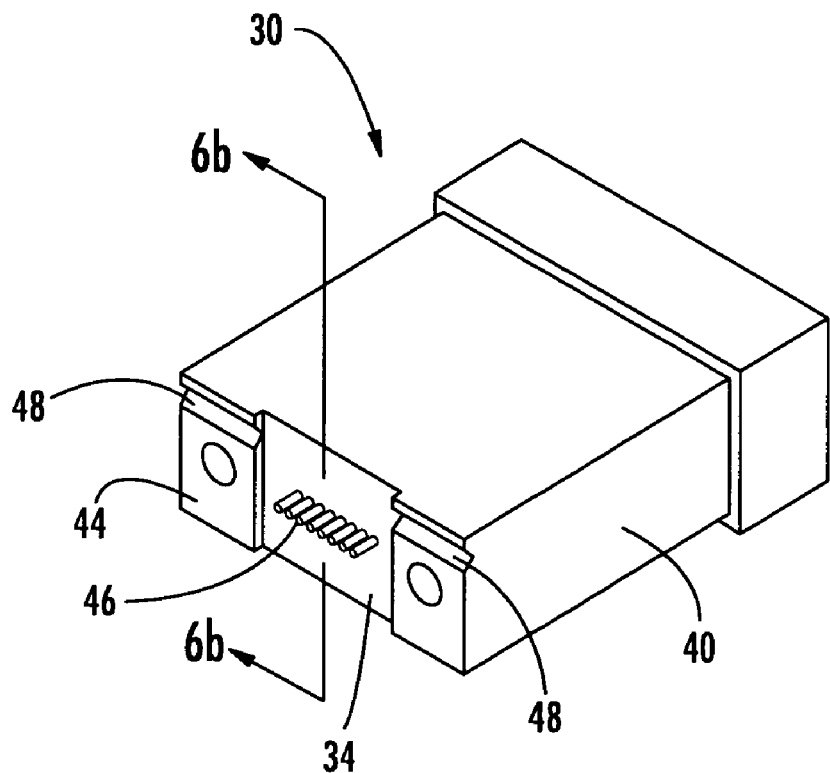
FIGS. 6a-b are perspective and enlarged cross-sectional views, respectively, of a ferrule having reference features that taper inwardly from the bumpers.
Figure 6B:
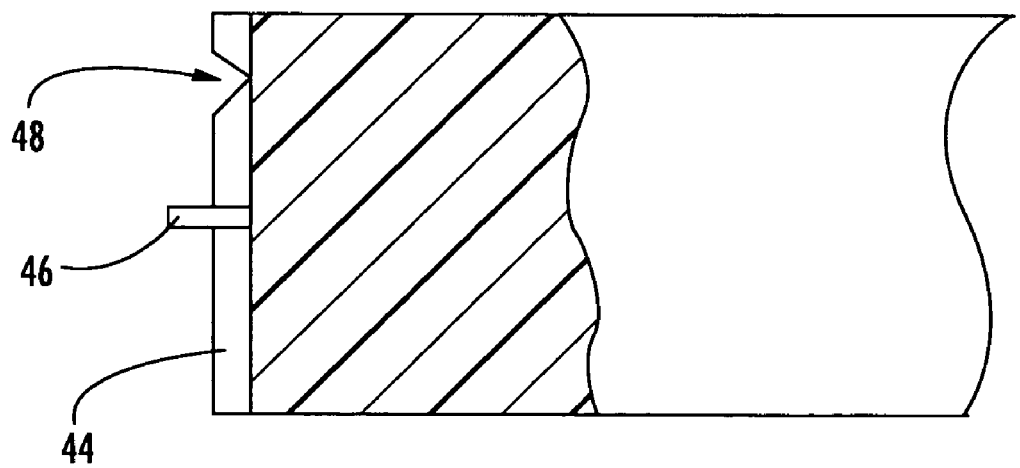
Figure 6C:
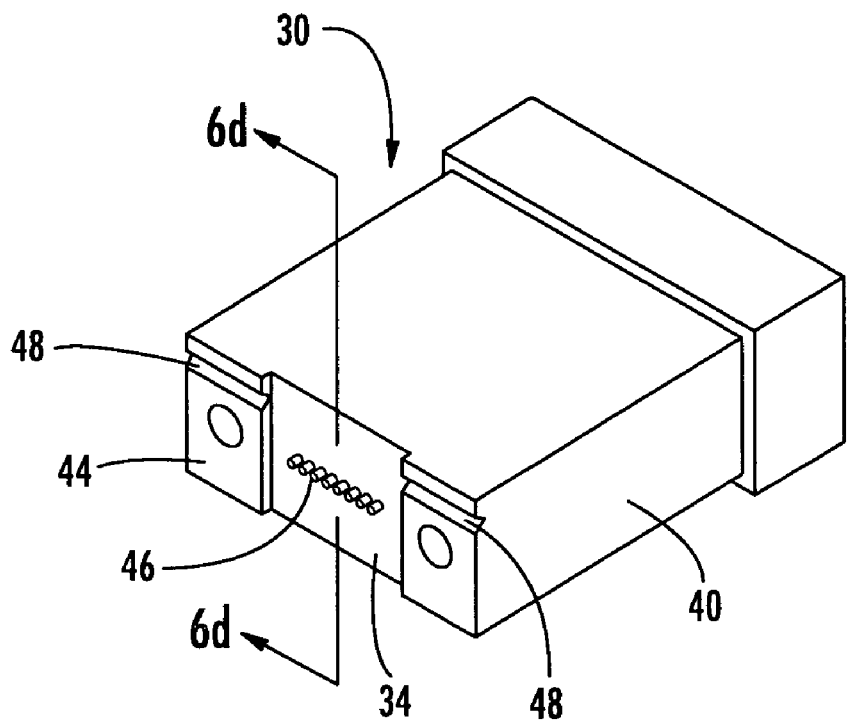
FIGS. 6c-d are perspective and enlarged cross-sectional views, respectively, corresponding to the ferrule of FIGS. 6a-b following a fiber polishing process.
Figure 6D:
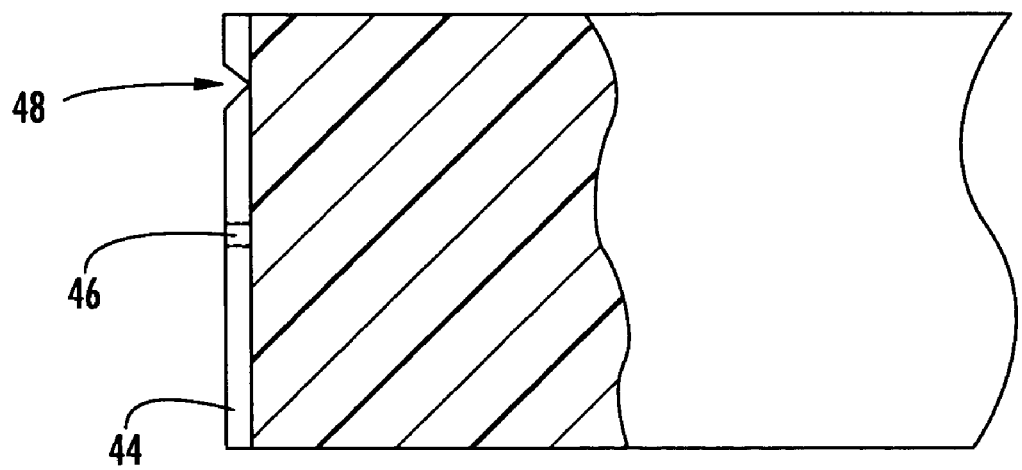

Referring to FIGS. 6a-d, in a still further embodiment a ferrule 30 is shown in which the molded-in reference feature 48 comprises a recessed, non-orthogonal (i.e., V-shaped) horizontally disposed groove formed in a bumper 44. FIGS. 6a-b show the protrusion of the optical fibers 46 and the bumpers 44 prior to polishing. FIGS. 6c-d show the protrusion of the optical fibers 46 and the bumpers 44 after polishing. The guide pin openings 36 open through the bumpers 44. The optical fibers 46 extend beyond the surface of the bumpers 44 and the geometric reference features 48 prior to polishing. After polishing, the depth of the non-orthogonal geometric reference features 48, as well as the length of the protruding optical fibers 46, is reduced. By measuring the angled surfaces of the geometric reference features 48 both prior to and after polishing, the amount of material removed from the bumpers 44 during polishing may be determined. From the resultant height of each of the bumpers 44, the height of the protruding optical fibers 46 may be determined. In contrast to the embodiments shown in FIGS. 2-5, the geometric reference features 48 shown in FIGS. 6-9 are altered during a polishing process and preferably are subsequently removed, such as by grinding or laser cutting.

By measuring and comparing the depth of the reference features 48 before (e.g., using the tooling dimensions of the ferrule mold) and after polishing (e.g., viewing the geometric reference features 48 using a non-interference vision system), changes in the depths of the features 48 may be determined. The depth changes are then utilized to determine how much of the bumpers 44 and the optical fibers 46 have been ground or polished away. In addition, by comparing the depths of the left-hand and right-hand geometric reference features 48, the polishing angle in the direction of the long axis (i.e., X-direction) of the end face 34 may be determined. An end face 34 polished normal to the longitudinal axis of the ferrule body 40 results in both the left-hand and right-hand reference features 48 having the same shape and depth after polishing. After polishing and measuring, the bumpers 44 may be removed to a predetermined depth, such as to the surface of the end face 34, thereby reducing or eliminating the geometric reference features 48 altogether.

Figure 7A:
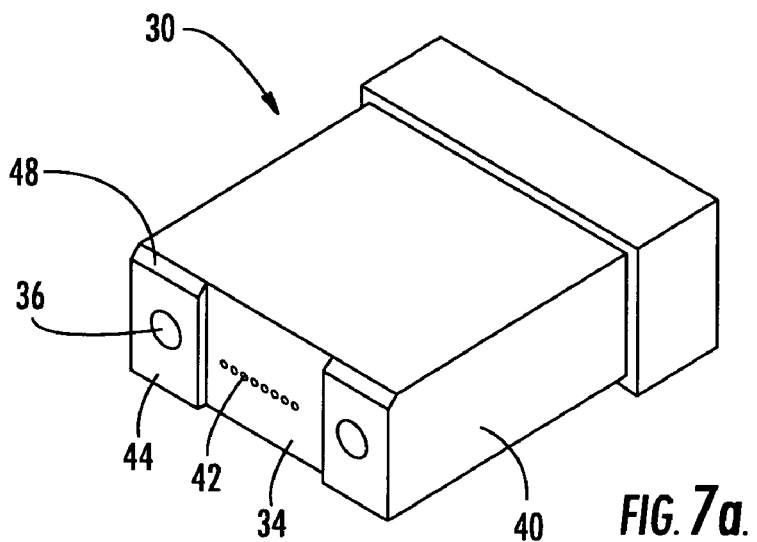
FIGS. 7a-c are perspective views illustrating ferrules having bumpers and angled geometric reference features.
Figure 7B:
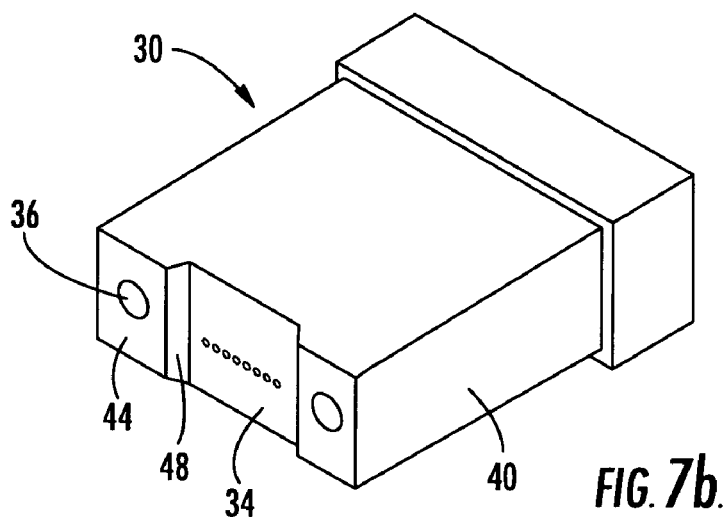
Figure 7C:
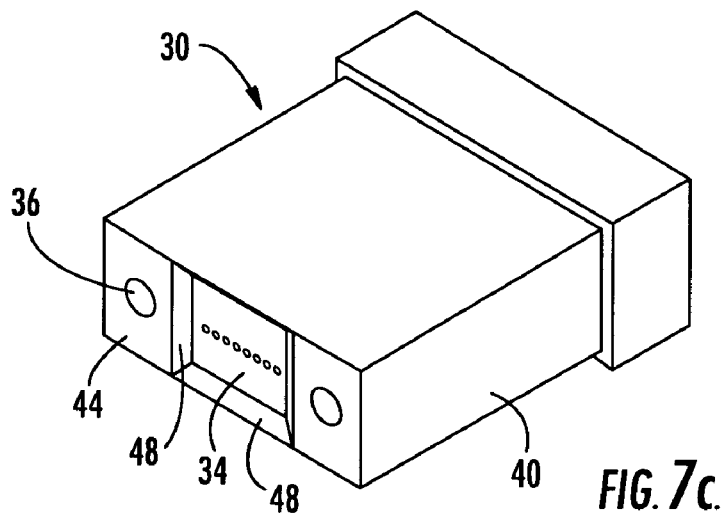

Referring to FIGS. 7*a-c*, in a still further embodiment various examples of molded fiber optic ferrules 30 with bumpers 44 having angled geometric reference features 48 are shown. The molded reference features 48 comprise a predetermined angle relative to the surface of the end face 34. After polishing, the height of optical fibers 46 may be determined by measuring the resulting height of the bumper 44 or geometric reference feature 48. Referring to FIG. 7*a*, one or more geometric reference features 48 extending at an angle between the top surface of the ferrule body 40 and a bumper 44 may be used to determine the polishing angle in the direction of the long axis (i.e., x-direction) of the end face 34. Referring to FIG. 7*b*, one or more geometric reference features 48 extending at an angle between the surface of the end face 34 and a bumper 44 may be used to determine the polishing angle in the direction of the short axis (i.e., y-direction) of the end face 34. Referring to FIG. 7*c*, one or more geometric reference features 48 extending at an angle between the top surface of the ferrule body 40 or the surface of the end face 34 and bumper 44 may be used to determine the polishing angles in the direction of both the long axis (i.e., x-direction) and the short axis (i.e., y-direction) of the end face 34.

Figure 8A:
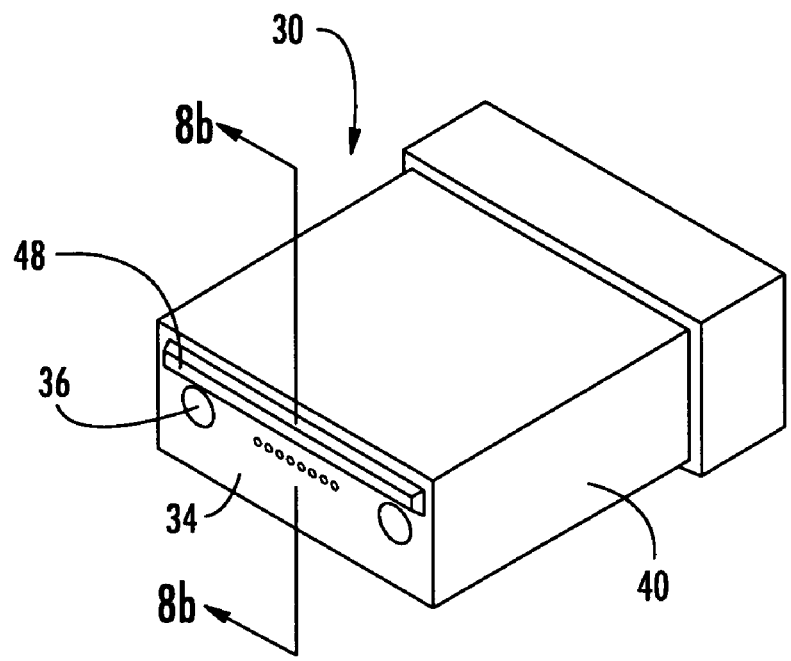
FIGS. 8a-b are perspective and enlarged cross-sectional views, respectively, of a ferrule having a reference feature disposed on the end face.
Figure 8B:
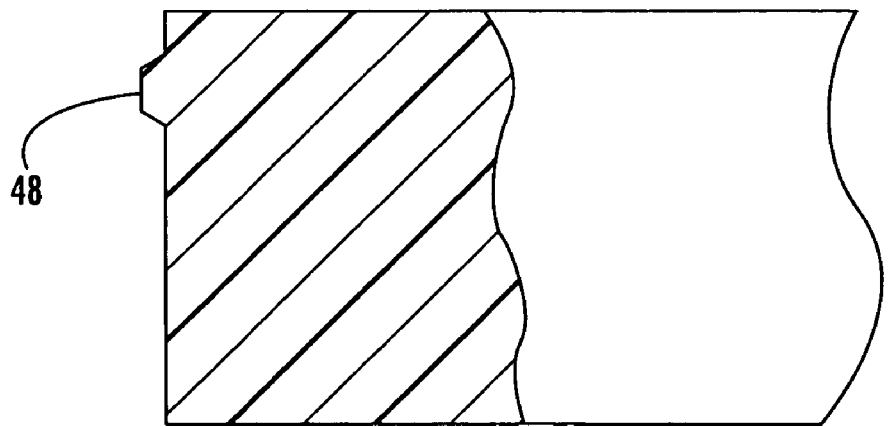
Figure 8C:
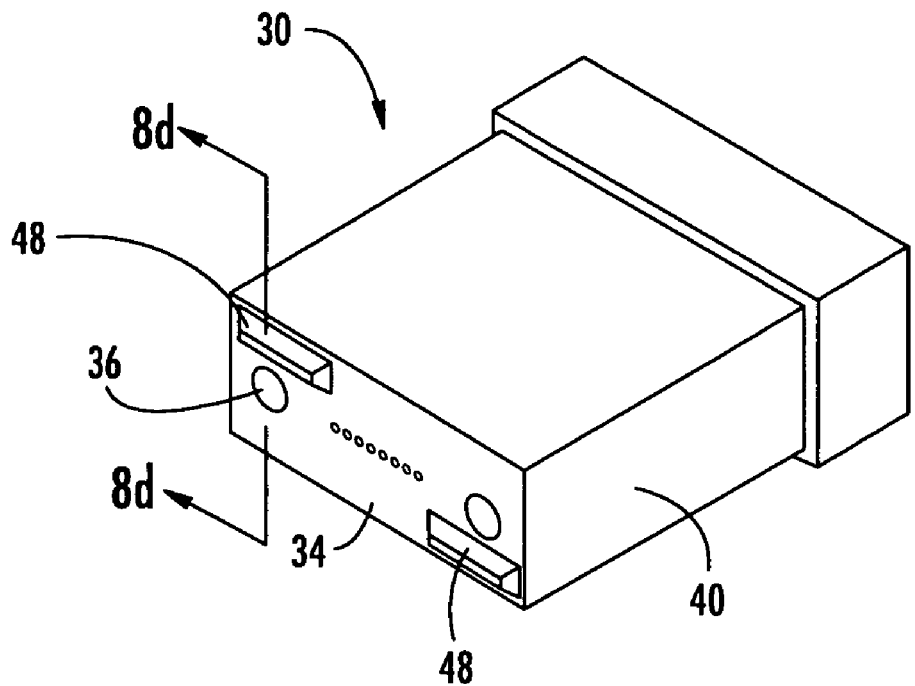
FIGS. 8c-d are perspective and enlarged cross-sectional views, respectively, of a ferrule having a pair of reference features diametrically disposed on the end face.
Figure 8D:
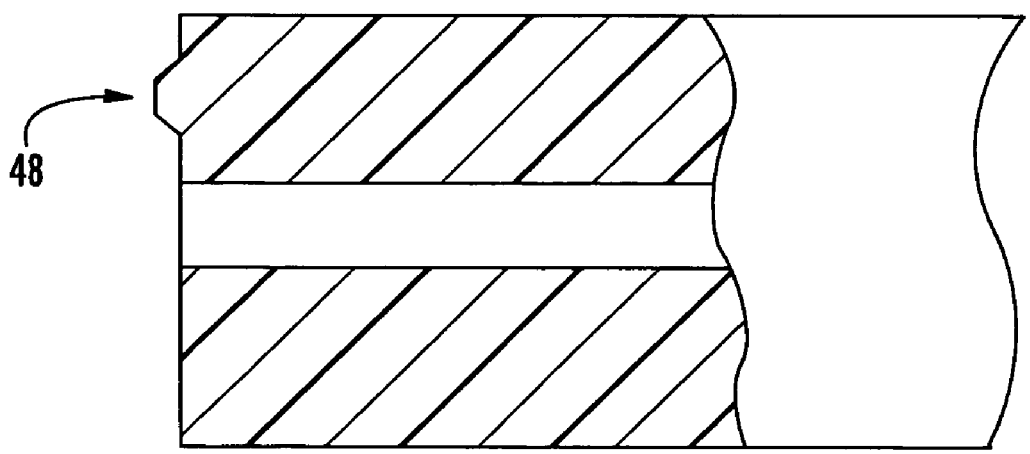

Referring to FIGS. 8*a-d*, in a still further embodiment two examples of molded fiber optic ferrules 30 having outwardly extending geometric reference features 48 are shown. As shown in FIGS. 8*a-b*, a single elongate, trapezoid-shaped geometric reference feature 48 protrudes outwardly from the surface of the end face 34. As shown in FIGS. 8*c-d*, a pair of trapezoid-shaped geometric reference features 48 protrudes from the surface of the end face 34 at diametrically opposed corner locations. While the reference features 48 are shown having a trapezoid shape, it is envisioned that the shape may be rectangular, spherical, pyramidal, conical, etc. As the protruding optical fibers and the reference feature 48 are polished, the frontal surface area of the reference feature 48 increases. By measuring the height of the features 48 or the area of the frontal surface after polishing, the height of the polished optical fibers may be determined. In addition, by comparing the surface of the single geometric reference feature 48 (FIG. 8*a*) across the entire surface, or the surfaces of the pair of separate features 48 (FIG. 8*c*), it may be determined whether the end face 34 was polished normal to the longitudinal axis of the ferrule body 40. A non-uniform removal of the geometric reference feature(s) 48 along the frontal surface may be used to determine the angularity of the end face 34 relative to the guide pin openings 36, which are formed in the molding process to be perpendicular to the initial frontal surface of the geometric reference surface(s) 48.

Figure 9A:
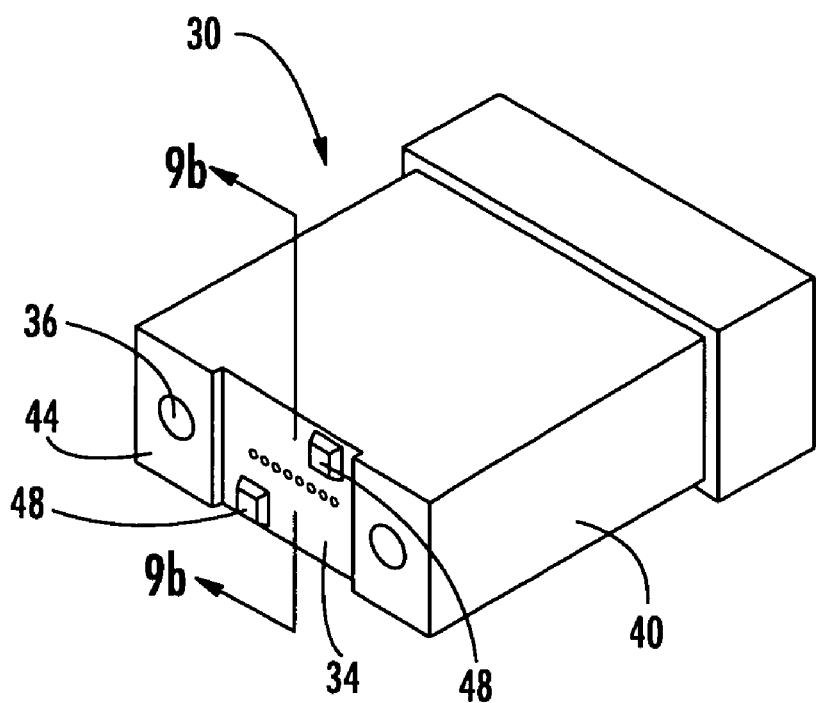
FIGS. 9a-b are perspective and enlarged cross-sectional views, respectively, of a ferrule having a pair of reference features diametrically disposed on the end face.
Figure 9B:
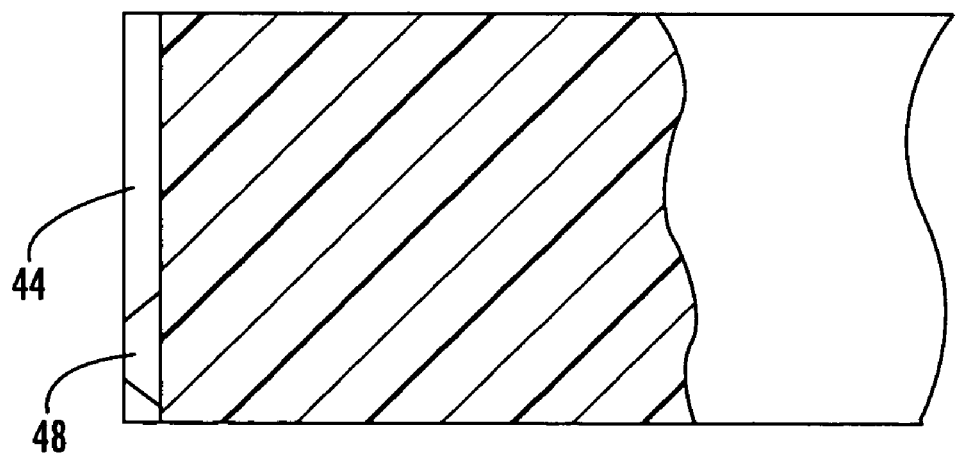

Referring to FIGS. 9*a-d*, in a still further embodiment a ferrule 30 having a pair of reference features 48 is shown. As shown in FIG. 9*a*, rectangular-faced reference features 48 protrude from the surface of the end face 34 at diametrically opposed locations between a pair of bumpers 44. Optical fibers that are polished normal to the longitudinal axis of the ferrule body 40 result in the pair of geometric reference features 48 having an equal surface area after polishing.

Figure 10A:
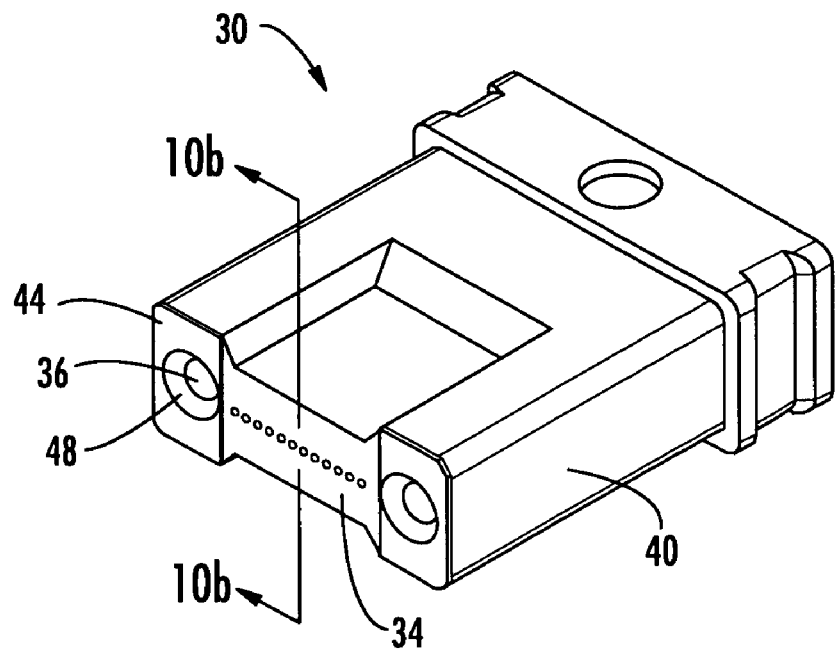
FIGS. 10a-b are perspective and enlarged end face views, respectively, of a ferrule having reference features that taper inwardly into the guide pin openings.
Figure 10B:
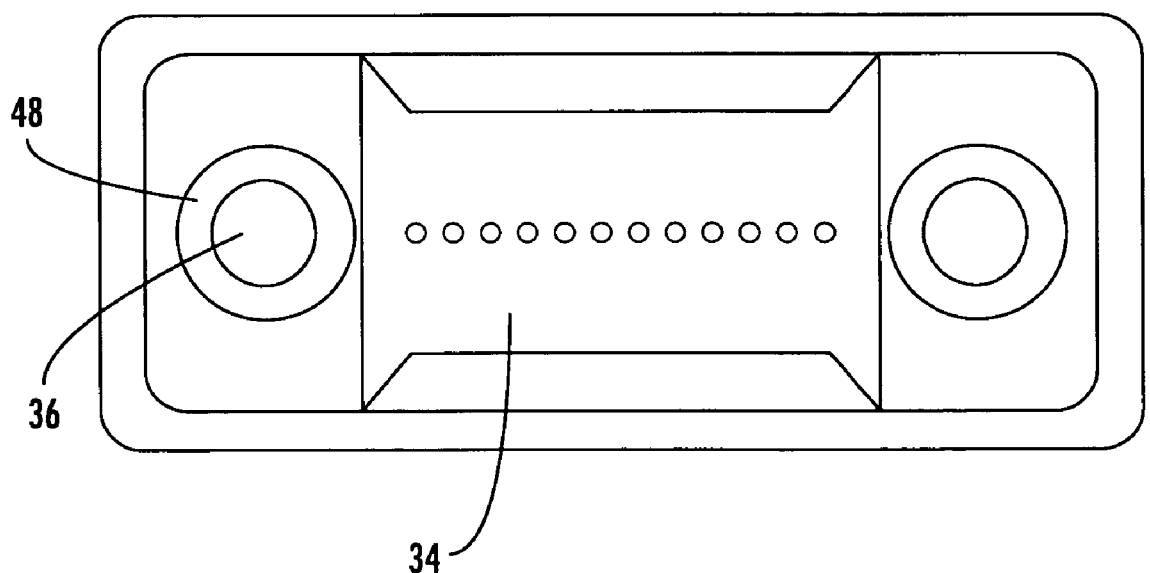

Referring to FIGS. 10*a-b*, in a still further embodiment a ferrule 30 is shown having reference features 48 disposed within the guide pin openings 36. In this embodiment, the reference features 48 comprise a multi-functional version of the chamfer that already exists around the guide pin openings 36 of certain ferrule designs. The height of optical fibers (not shown) protruding from the fiber bores 42 may be determined by measuring the change in the depth of the reference features 48 disposed within the guide pin openings 36. The end face 34 lies in the same plane as the innermost edge of the reference surface. As the optical fibers are polished normal to the longitudinal axis of the ferrule body 40, the bumpers 44 and the reference features may decrease in depth. By measuring and comparing the depth of each reference feature 48 after polishing, it may be determined whether or not the optical fibers were polished normal to the longitudinal axis of the ferrule body 40. Optical fibers that are polished normal to the longitudinal axis of the ferrule body 40 result in the reference features 48 having an equal depth after polishing. In addition to serving as a reference feature for the polishing angle, the tapered surface of the geometric reference features 48 may be used to help guide the guide pins into their respective guide pin opening 36.

Figure 11A:
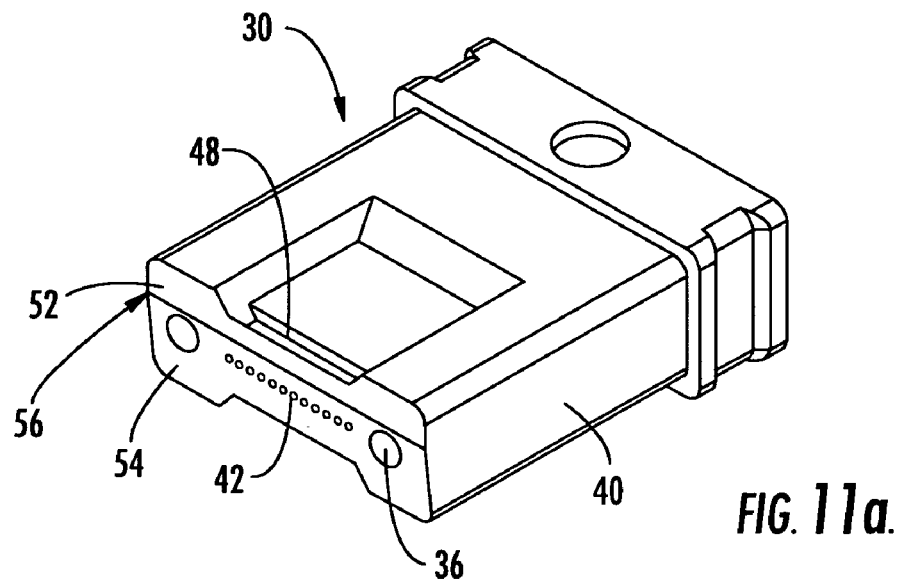
FIGS. 11a-c are perspective, end face and enlarged cross-sectional views, respectively, of a ferrule having a recessed reference feature located on an angled end face surface.
Figure 11B:
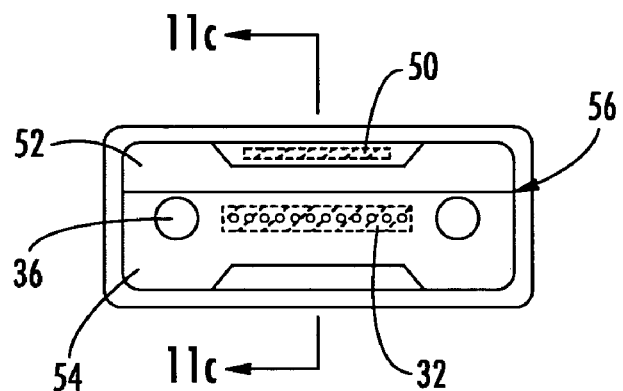
Figure 11C:
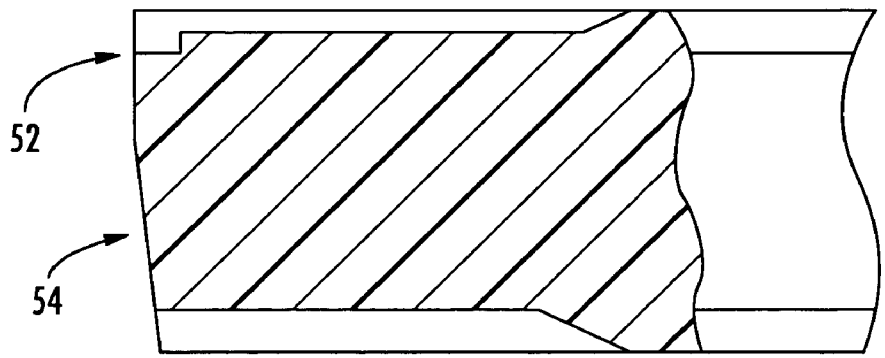

Referring to FIGS. 11*a-c*, in a still further embodiment a ferrule 30 is shown having an end face 34 comprising a first end face surface 52 disposed normal to the longitudinal axis of the ferrule body 40, and a second end face surface 54 disposed at an angle relative to the first end face surface 52 and the longitudinal axis of the ferrule body 40. The first end face surface 52 and the second end face surface 54 are divided by a separation line 56 that extends above the fiber bores 42 and the guide pin openings 36 in the direction of the long axis (i.e., x-direction) of the end face 34. The angle of the second end face surface 54 relative to the first end face surface 52 is in the range from about 6 degrees to about 12 degrees, preferably from about 6 degrees to about 10 degrees, more preferably from about 7.8 to about 8.2 degrees. In this embodiment, the plurality of fiber bores 42 and the guide pin openings 36 open through the second end face portion 54. The fiber bores 42 and the longitudinal axis of the guide pin openings 36 remain parallel to the longitudinal axis of the ferrule body 40. The ends of the optical fibers may be polished parallel to the first end face surface 52 and normal to the longitudinal axis of the ferrule body 40. Conversely, the ends of the optical fibers may be polished parallel to the second end face surface 54 and at an angle relative to the first end face surface 52 and the longitudinal axis of the ferrule body 40. Preferably, the polishing angle conforms to the angle between the first end face surface 52 and the second end face surface 54.

The end face 34 having a normal first end face surface 52 and an angled second end face surface 54 is an integrally formed, molded feature that is not machined subsequent to molding. In this regard, one mold may be used to produce a fiber optic ferrule 30 having an end face normal to the longitudinal axis of the ferrule body 40, and a fiber optic ferrule 30 having an end face disposed at an angle to the first end face surface 52 and the longitudinal axis of the ferrule body 40. The end face surface 52, 54 that is to be parallel to the optical fiber polishing angle is predetermined. By molding a ferrule 30 having two end face surfaces with a predetermined angle between them, as opposed to machining the angle subsequent to the molding process, the reproducibility of substantially identical parts is improved.

Figure 12A:
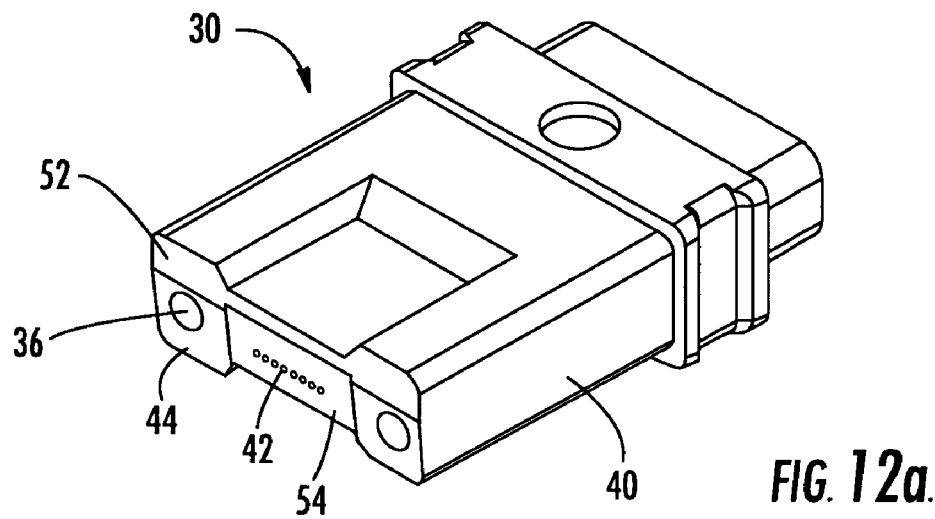
FIGS. 12a-c are perspective, end face and enlarged cross-sectional views, respectively, of a ferrule having a region of interest about the normal end face.
Figure 12B:
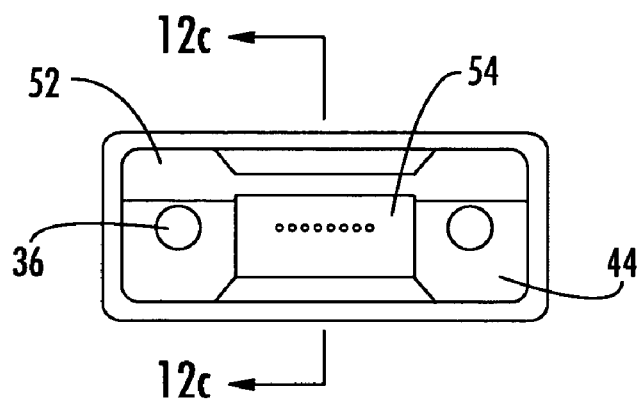
Figure 12C:
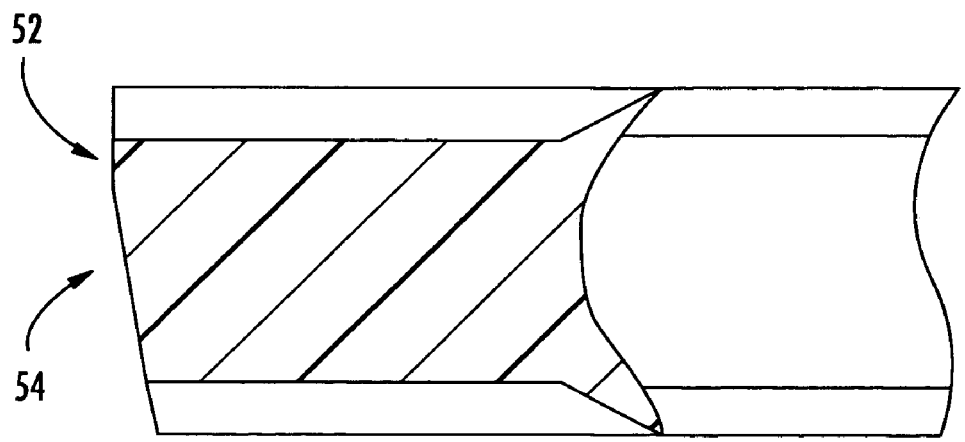

Referring to FIGS. 12a-c, in a still further embodiment a ferrule 30 is shown having an end face comprising a first end face surface 52 disposed normal to the longitudinal axis of the ferrule body 40, and a second end face surface 54 disposed at an angle relative to the first end face surface 52 and the longitudinal axis of the ferrule body 40. The first end face surface 52 and the second end face surface 54 are divided by a separation line 56 that extends above the fiber bores 42 and the guide pin openings 36 in the direction of the long axis (i.e., x-direction) of the end face 34. In this embodiment, the plurality of fiber bores 42 open through the second end face surface 54, while the guide pin openings 36 open through the bumpers 44. The fiber bores 42 and the longitudinal axis of the guide pin openings 36 remain parallel to the longitudinal axis of the ferrule body 40. The ends of the optical fibers may be polished parallel to either the first or second end face surface.

After polishing, the height of the optical fibers may be determined by measuring the resulting height of the bumpers 44. In addition, by comparing the respective height of each bumper 44, it may be determined whether or not the polishing angle was parallel to the second end face surface 54. A polishing angle parallel to the second end face surface 54 and at an angle relative to the first end face surface 52 and the longitudinal axis of the ferrule body 40 results in the bumpers 44 having equal heights. Likewise, a polishing angle parallel to the first end face surface 52 and normal to the longitudinal axis of the ferrule body 40 results in the bumpers 44 having equal heights at corresponding locations.

Figure 13A:
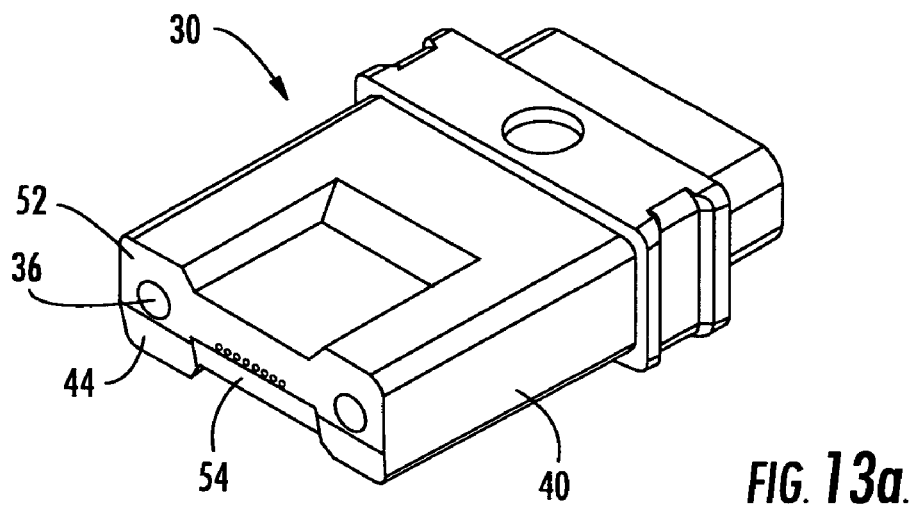
FIGS. 13a-c are perspective, end face and enlarged cross-sectional views, respectively, of a ferrule having a plurality of fiber bores located on a normal surface of the end face.
Figure 13B:
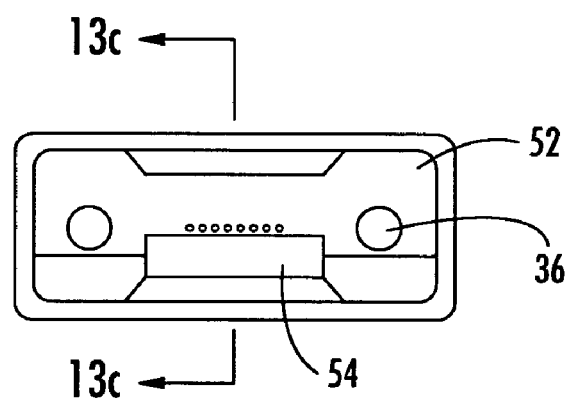
Figure 13C:
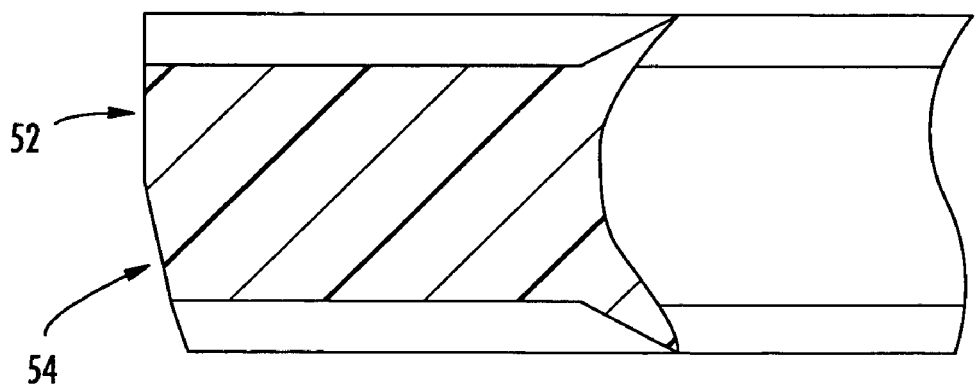

Referring to FIGS. 13a-c, in a still further embodiment a ferrule 30 is shown having an end face comprising a first end face surface 52 disposed normal to the longitudinal axis of the ferrule body 40, and a second end face surface 54 disposed at an angle relative to the first end face surface 52 and the longitudinal axis of the ferrule body 40. The first end face surface 52 and the second end face surface 54 are divided by a separation line 56 that extends below the fiber bores 42 and the guide pin openings 36 in the direction of the long axis (i.e., x-direction) of the end face 34. The plurality of fiber bores 42 and the guide pin openings 36 open through the first end face surface 52. The fiber bores 42 and the longitudinal axis of the guide pin openings 36 remain parallel to the longitudinal axis of the ferrule body 40. In this embodiment, the optical fibers may be polished parallel to the first end face surface 52 and normal to the longitudinal axis of the ferrule body 40, or may be polished parallel to the second end face surface 54.

Figure 14A:
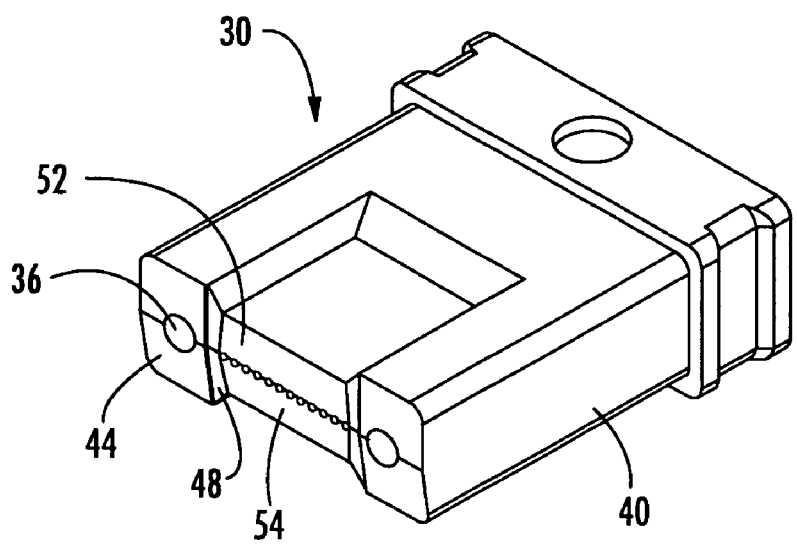
FIGS. 14a-c are perspective, end face and enlarged cross-sectional views, respectively, of a ferrule having a divided, angled end face.
Figure 14B:
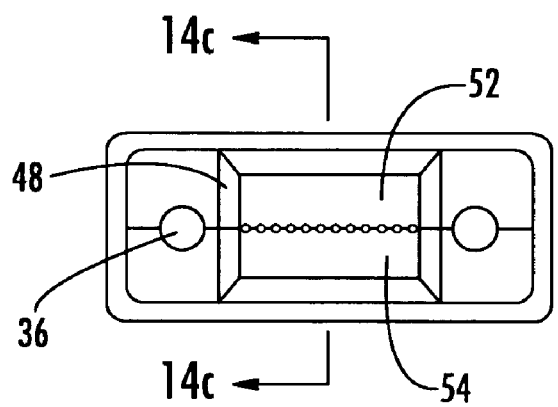
Figure 14C:
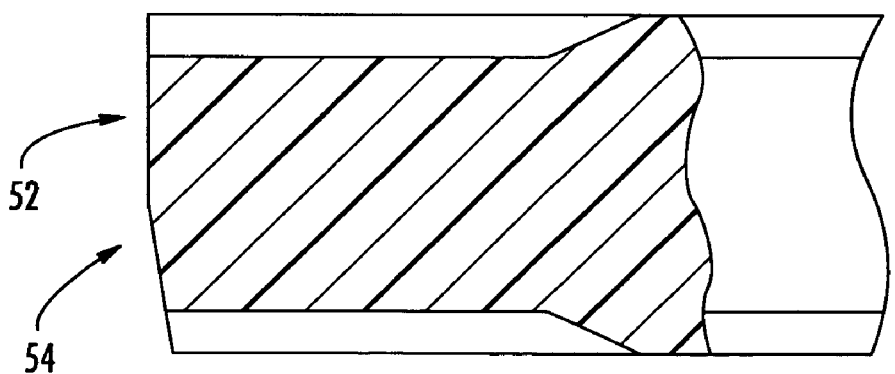

Referring to FIGS. 14a-c, in a still further embodiment a ferrule 30 is shown having an end face comprising a first end face surface 52 disposed normal to the longitudinal axis of the ferrule body 40, and a second end face surface 54 disposed at an angle relative to the first end face surface 52 and the longitudinal axis of the ferrule body 40. The first end face surface 52 and the second end face surface 54 are divided into approximately equal surface areas by a separation line 56 that runs along the fiber bores 42 in the direction of the long axis (i.e., x-direction) of the end face 34. The plurality of fiber bores 42 and the guide pin openings 36 open through both the first end face surface 52 and the second end face surface 54 in an approximately equal amount. The fiber bores 42 and the longitudinal axis of the guide pin openings 36 are substantially parallel to the longitudinal axis of the ferrule body 40. Although not shown, the optical fibers may be flush with the separation line 56, but preferably protrude a predetermined amount from both the first end face surface 52 and the second end face surface 54. The ends of the optical fibers may be polished parallel to the first end face surface 52 and normal to the longitudinal axis of the ferrule body 40. Conversely, the ends of the optical fibers may be polished parallel to the second end face surface 54 and at an angle relative to the first end face surface 52 and the longitudinal axis of the ferrule body 40. In the latter instance, the polishing angle conforms to the angle between the first end face surface 52 and the second end face surface 54. The bumpers 44 protrude beyond both the first end face surface 52 and the second end face surface 54. The height of the bumpers 44 after polishing may be measured and used to determine the heights of the optical fibers and/or the polishing angle. After polishing and measuring the bumpers 44, the bumpers 44 may be removed to a predetermined depth, as previously described.

Figure 15:
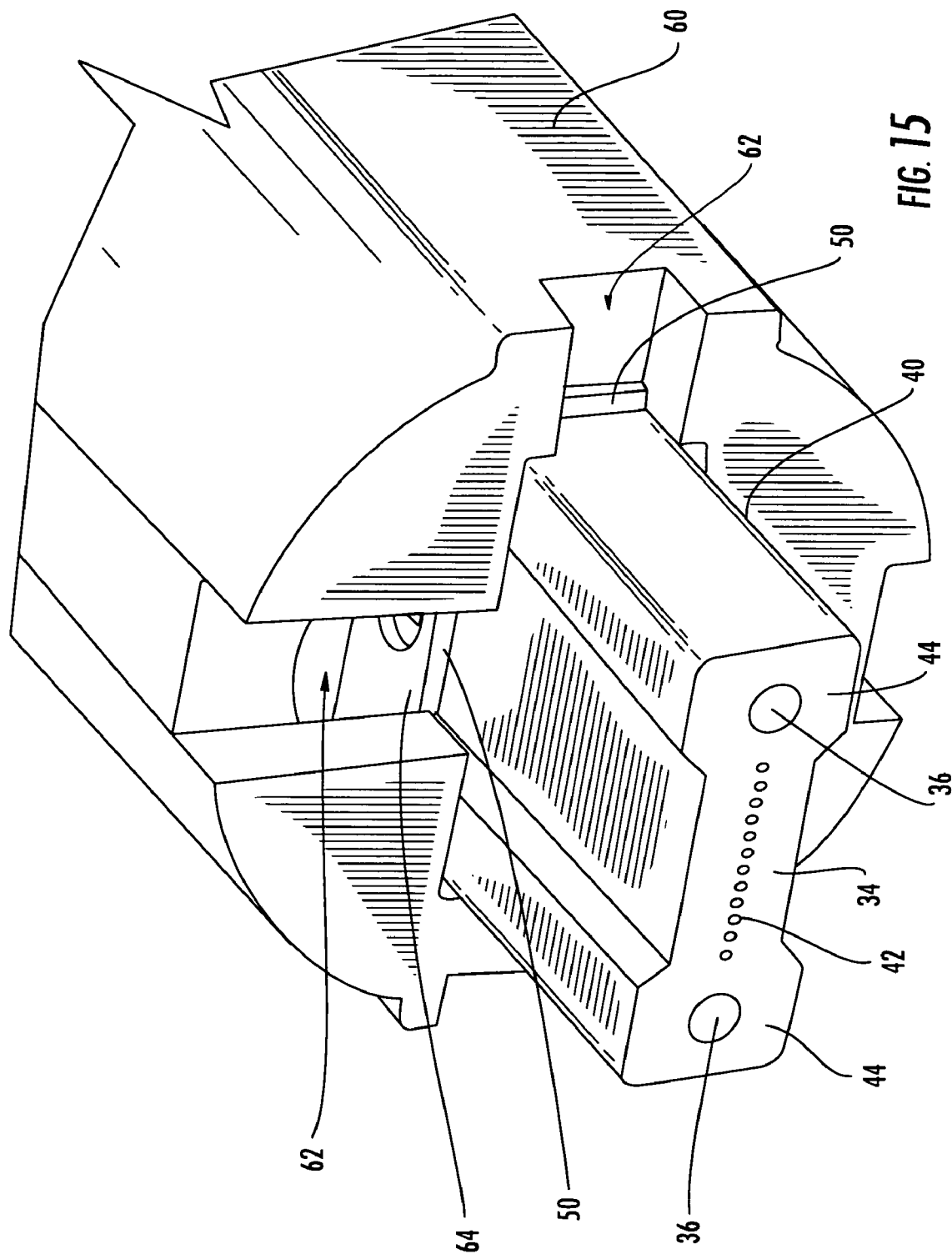
FIG. 15 is a perspective view of a connector including a reference surface on a portion of a ferrule shoulder.
Figure 16:
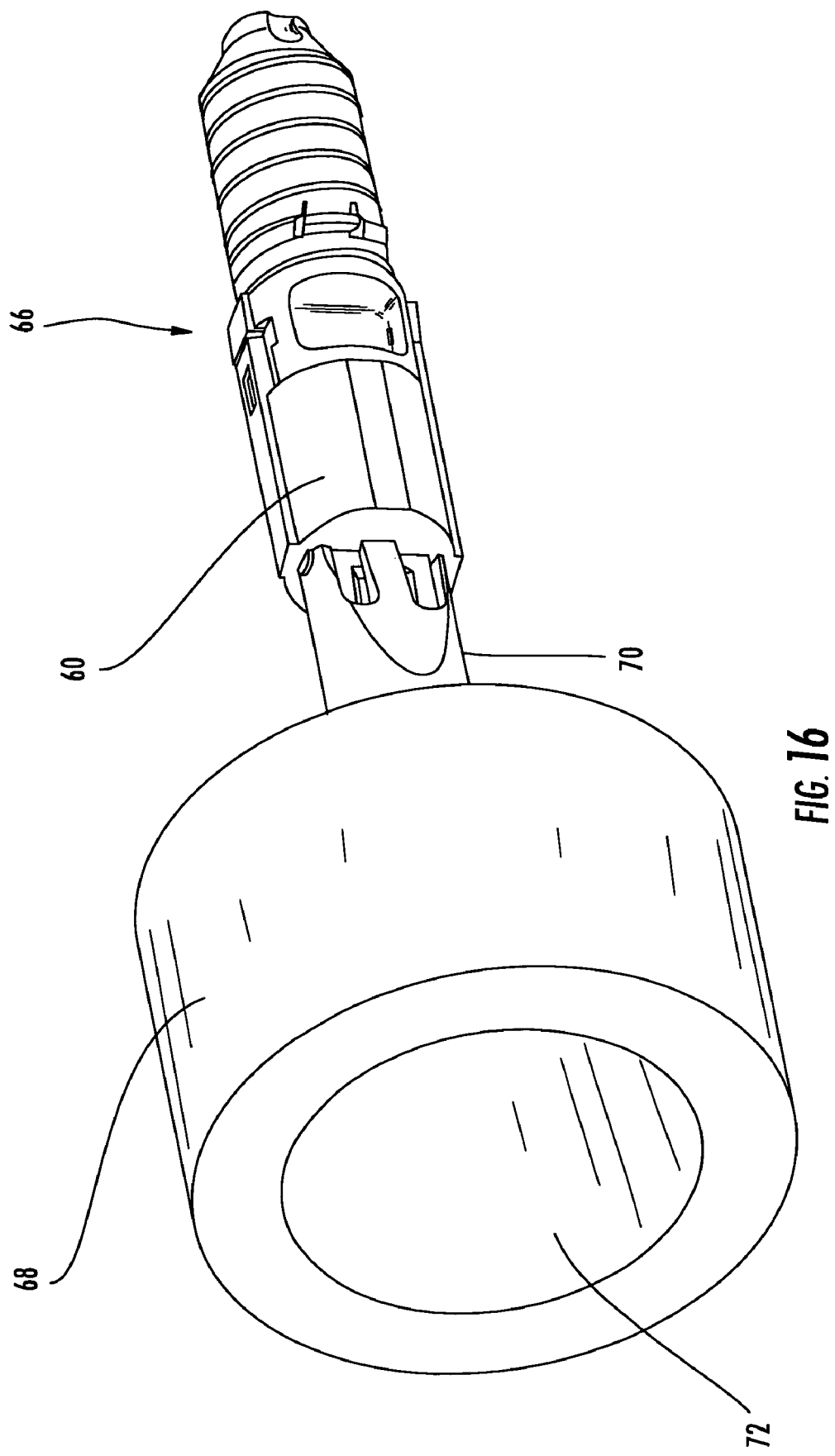
FIG. 16 is a perspective view of a connector engaged with a polishing jig.

Referring to FIGS. 15-16, a CON2R MT connector available from Corning Cable Systems of Hickory, N.C. is shown. The connector includes a multifiber ferrule body 40 defining an end face 34, bumpers 44, guide pin openings 36, fiber bores 42 and a rearward shoulder 64 about a non-connective end of the ferrule body 40. The shoulder 64 defines a reference surface 50 that is accessible after connector assembly. The ferrule is maintained within a connector housing 60 of a connector 66 that defines slots 62 or cut-away portions for providing access to the reference surface 50. Referring to FIG. 16, an interferometer interface tool 68 defines an end 70 that engages the ferrule through the slots 62 to access the same reference surfaces as those used in polishing. The tool 68 defines an open end 72 for engaging an interferometer.

Figure 17:
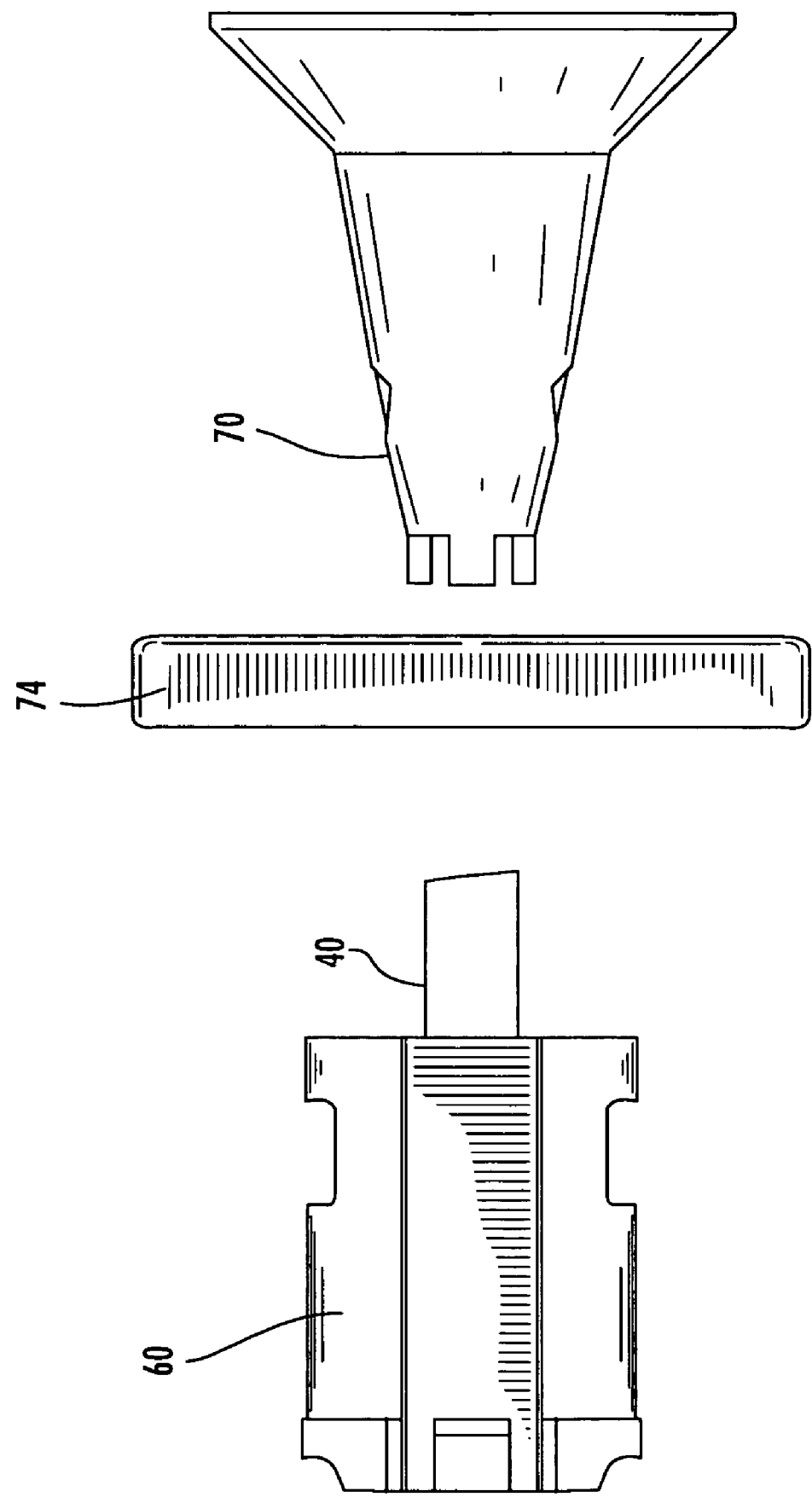
FIG. 17 is a side view of an assembly including a reference datum plate, a connector and a jig.

Referring to FIG. 17, a reference datum 74 may be placed against feet of the interferometer interface tool 70. The interferometer then references out the flat or datum. The tool 68 may then be inserted into the connector and a second measurement made. The actual angle of the connector is the difference between the two measurements.

Figure 18A:
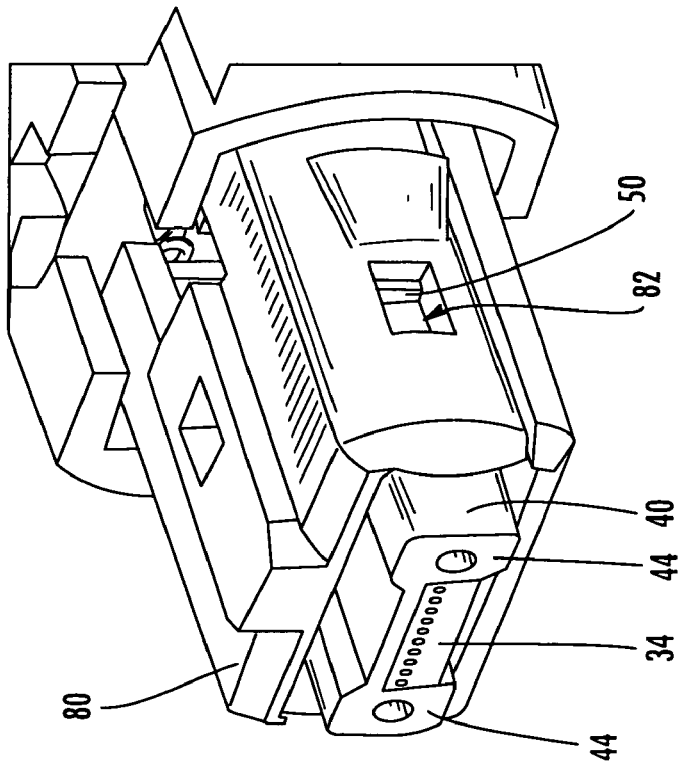
FIGS. 18a-b are perspective views of a connector including a window to access a reference surface on a shoulder of a ferrule.
Figure 18B:
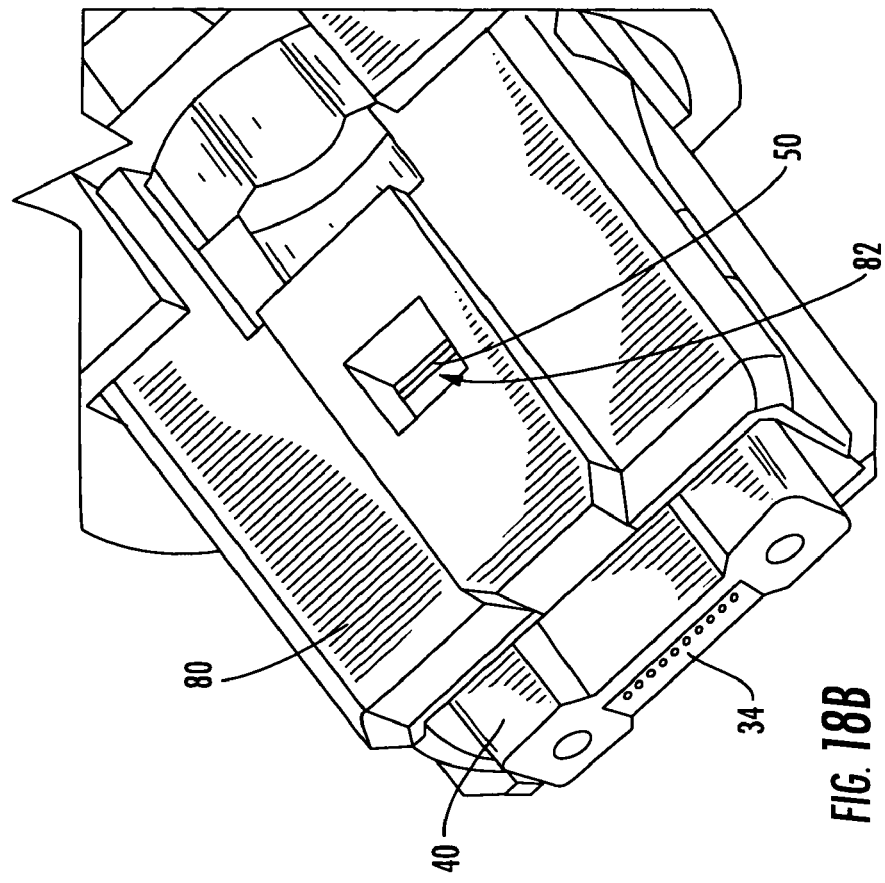

Referring to FIGS. 18a-b, another embodiment of a reference surface on a ferrule is shown. The connector shown includes a ferrule body 40 defining an end face 34. The ferrule is maintained within a connector housing 80 that defines one or more windows 82 for accessing the reference surfaces 50 of the shoulder portion of the ferrule. The reference surfaces 50 may be used for accurate end face geometry measurement.

In all embodiments shown, it is important that the face of the ferrule is square to the guide pin bores and clear of epoxy residue from the bonding operation. To allow the face of the ferrule to be suitable as a metrology surface it must have the necessary relationship (squareness) to the two guide pin bores, be smooth enough for current metrology tools to read and be clear enough of epoxy residue to be useful. The end face may be cleared using a mechanical wipe and heated compressed air or steam, among others. The objective is to leave a clean end face without damaging the fiber retention properties of the assembly. This may be less critical in the case of a non-bonded solution. The relationship of the face to the guide pin bores may be other than square, as long as the error to square is constant and known, the error may be referenced out. In all embodiments, the ability to access a surface of the ferrule that has a precise, known relationship to the guide pin bores is advantageous.

The foregoing provides a detailed description of exemplary embodiments of the invention. Although the molded fiber optic ferrule and method of making the same have been described with reference to preferred embodiments and examples thereof, other embodiments and examples may perform similar functions and/or achieve similar results. All such equivalent embodiments and examples are within the spirit and scope of the present invention and are intended to be covered by the following claims.

The invention claimed is:

1. A ferrule, comprising:
   a molded ferrule body defining at least one fiber bore for receiving an optical fiber therein;
   an end face positioned about the at least one fiber bore of a connective end of the ferrule body providing an end face plane; and
   an integral reference surface on the ferrule body providing a reference plane substantially parallel to the end face plane and used for determining the angularity of the end face plane;
   wherein the integral reference surface is not machined subsequent to a ferrule molding process; and
   wherein the integral reference surface is accessible after assembly of the ferrule body into a connector body.

2. The ferrule of claim 1, wherein the ferrule defines a shoulder about a non-connective end portion and the reference surface is located on a portion of the shoulder, and wherein the integral reference surface is accessible through at least one window defined by the connector body.

3. The ferrule of claim 1, wherein the ferrule is a multi-fiber ferrule and defines a pair of guide pin bores for receiving guide pins therein.

4. The ferrule of claim 3, wherein the end face is about square to the pair of guide pin bores.

5. The ferrule of claim 3, wherein the guide pin bores are perpendicular to the end face plane to within 0.003 mm over the length of the guide pin bores.

6. The ferrule of claim 1, wherein the integral reference surface is a metrology datum and obviates the need for using precision measurement pins to determine end face angularity.

7. The ferrule of claim 1, wherein the ferrule further defines a pair of polishing bumpers and wherein the end face is not positioned on the polishing bumpers or at a position where the polishing bumpers are ground away after fiber polishing.

8. The ferrule of claim 1, wherein the integral reference surface is recessed from the end face within the guide pin bores.

9. The ferrule of claim 1, wherein the end face is not machined subsequent to molding.

10. The ferrule of claim 1, wherein the end face is not polished subsequent to molding.

11. The ferrule of claim 1, wherein the integral reference surface is not located on the end face.

12. A multi-fiber ferrule defining fiber bores for receiving optical fibers therein and guide pin bores for receiving guide pins therein, the ferrule comprising:
    a connective end defining an end face about the fiber bores;
    a rear non-connective portion of the ferrule defining a protruding shoulder, and
    an integral reference datum positioned on a surface of the shoulder accessible for determining the angularity of a plane defined by the end face, wherein the integral datum is accessible when the ferrule is received within a connector body.

13. The multi-fiber ferrule of claim 12, wherein the connector body defines at least one window for providing access to the integral reference datum.

14. The multi-fiber ferrule of claim 12, wherein the connector body defines at least one recess for providing access to the integral reference datum.

15. The multi-fiber ferrule of claim 12, wherein the integral reference datum is not machined subsequent to molding the multi-fiber ferrule.

16. A method for determining the angularity of an end face of a multi-fiber ferrule positioned about a plurality of fiber bores, comprising:
    providing a ferrule having an integral reference surface defining a reference plane; and
    comparing the plane defined by the integral reference surface to a plane defined by the end face.

17. The method of claim 16, wherein the ferrule defines a shoulder about a rear portion of the ferrule and the integral reference surface is located on the shoulder and is accessible through a connector body mounted on the ferrule.

* * * * *